United States Patent [19]
Okuno et al.

[11] Patent Number: 5,960,146
[45] Date of Patent: Sep. 28, 1999

[54] OPTICAL FIBER AND LIGHT SOURCE APPARATUS

[75] Inventors: Toshiaki Okuno; Masashi Onishi; Masayuki Nishimura, all of Yokohama; Satoki Kawanishi, Shinjuku-ku; Hidehiko Takara, Shinjuku-ku; Kunihiko Mori, Shinjuku-ku, all of Japan

[73] Assignees: Sumitomo Electric Industries, Ltd., Osaka; Nippon Telegraph and Telephone Corporation, Tokyo, both of Japan

[21] Appl. No.: 08/899,571

[22] Filed: Jul. 24, 1997

[30] Foreign Application Priority Data

Jul. 24, 1996 [JP] Japan .................................. 8-195078

[51] Int. Cl.$^6$ ............................... G02B 6/16; G02F 1/35
[52] U.S. Cl. ........................ 385/122; 359/332; 385/123
[58] Field of Search ................................. 385/15, 27, 28, 385/122, 123; 359/326, 332, 188

[56] References Cited

U.S. PATENT DOCUMENTS

| | | | |
|---|---|---|---|
| 4,406,516 | 9/1983 | Hasegawa | 385/122 X |
| 5,343,322 | 8/1994 | Pirio et al. | 385/28 X |
| 5,504,829 | 4/1996 | Evans et al. | 385/123 |
| 5,532,861 | 7/1996 | Pirio et al. | 385/122 X |
| 5,532,868 | 7/1996 | Gnauck et al. | 359/332 |
| 5,717,797 | 2/1998 | Evans | 385/27 |
| 5,809,196 | 9/1998 | Meli et al. | 385/123 |
| 5,854,871 | 12/1998 | Akasaka | 385/123 |

OTHER PUBLICATIONS

Arai, et al, Development of Optical Fiber for Broad Band FWM, First Optoelectronics and Communications Conference (OECC '96) Technical Digest, Jul. 1996, pp. 276–277.

Morioka, T. et al, Transform–Limited, Femtosecond WDM Pulse Generation by Spectral Filtering of Gigahertz Super Continuum, Electronics Letters vol. 30 No. 14, Jul. 7, 1994, pp. 1166–1168.

Morioka, T. et al, Multiwavelength Picosecond Pulse Source with Low Jitter and High Optical Frequency Stability Bassed on 200nm Supercontinuum Filtering, Electronics Letters, vol. 31 No. 13, Jun. 22, 1995, pp. 1064–1066.

Holmes, M.J. et al, Highly Nonlinear Optical Fiber for all Optical Processing Applications,IEEE Photonics Technology Letters, vol. 7. No. 9, Sep. 1995, pp. 1045–1047.

Mori, et al, More–Than–100–Nanometer–Range Ultra–Short Pulse Generation Using Supercontinuum in an Optical Fiber Pumped by Amplified LD Pulses, NTT Transmission Systems Laboratories Publication B920, Sep. 1993, pp. 1 & 4–161.

Mori, et al, Supercontinuum Generating Near Zero Dispersion in Optical Fibers (Pico–Second Pulse Generation Over Wide Spectral Range), NTT Transmission Systems Laboritories Publication C–255, Sep. 1992, pp. 4–277.

Kubo, et al, Dispersion Flattened Single–Mode Fiber for 10,000km Transmission System, ECOC '90, Sep. 1990, pp. 505–508.

Morioka, T. et al, 100 GBITS/S +10 Channel OTDM/WDM Transmission Using a Single Supercontinuum WDM Source, an NTT Optical Network Systems Laboritories Publication, Feb. 1996, pp. PD21-1–PD21-5.

*Primary Examiner*—John D. Lee
*Attorney, Agent, or Firm*—Pillsbury Madison & Sutro LLP

[57] ABSTRACT

High peak pulse light is incident on an optical fiber having a dispersion decreasing region which serves as a main region for generating supercontinuum or idler light and in which the chromatic dispersion does not increase but at least partially decreases in the direction in which light travels. The fiber can be applied to broad band width idler light generation with both light transmission directions. Four wave mixing upon incidence of the light on the dispersion decreasing region of the optical fiber are efficiently obtained.

19 Claims, 29 Drawing Sheets

OPTICAL FREQUENCY SHIFT

OPTICAL FREQUENCY SHIFT

OPTICAL FREQUENCY SHIFT

OPTICAL FREQUENCY SHIFT

OPTICAL FREQUENCY SHIFT

OPTICAL FREQUENCY SHIFT

OPTICAL FREQUENCY SHIFT

OPTICAL FREQUENCY SHIFT

OPTICAL FIBER AND LIGHT SOURCE APPARATUS

BACKGROUND OF THE INVENTION

1. Field of the Invention

The present invention relates to an optical fiber which emits nonlinear light such as supercontinuum light or idler light generated based on a nonlinear optical effect caused by the incidence of an optical pulse having a high peak power.

2. Related Background Art

Along with the development of optical communication techniques, demand has arisen for light sources having large wavelength widths. As a technique associated with such light sources, generation of supercontinuum (SC) light as pulse light having a large wavelength width upon incidence of an optical pulse having a high peak power on an optical nonlinear medium has received a great deal of attention.

In recent years, experiments on generation of SC light using an optical fiber (to be also referred to as an SC fiber hereinafter) as a nonlinear medium have been made and reported. References 1 to 5 associated with SC light are as follows:

Reference 1: Mori et al.: '92 Fall Conference of the Institute of Electronic, Information, and Communication Engineers, C-255, pp. 4–277

Reference 2: Mori et al.: '93 Fall Conference of the Institute of Electronic, Information, and Communication Engineers, B-920, pp. 4–161

Reference 3: T. Morioka et al.: ELECTRONICS LETTERS, Jul. 7, 1994, Vol. 30, No. 14, pp. 1,166–1,168

Reference 4: T. Morioka et al.: OFC' 96, PD21, 1996

Reference 5: T. Morioka et al.: ELECTRONICS LETTERS, Jun. 22, 1995, Vol. 31, pp. 1,064–1,066

SUMMARY OF THE INVENTION

Reference 1 discloses the experimental result of generation of SC light when picosecond pulse light having a central frequency in a zero-dispersion region and a peak power of several 10 W is incident on optical fibers having different chromatic dispersions (normal or anomalous dispersion) or different lengths. The optical fiber having anomalous dispersion has a wider bandwidth of the SC light than that of the optical fiber having normal dispersion.

Reference 2 discloses the experimental result of generation of SC light when pulse light from a semiconductor laser (LD) is incident on optical fibers having different chromatic dispersions (dispersion-flattened and dispersion-fitted fibers) or different lengths. The dispersion-flattened optical fiber has a wider bandwidth of SC light than that of the dispersion-shifted optical fiber.

Reference 3 discloses generation of SC light when a dispersion-shifted fiber having a dispersion value of 0.1 (ps/nm/km) at length of 3 (km) and a wavelength of 1,541 nm is used as an optical fiber for SC light.

References 4 and 5 disclose spectra at the incident and exit ends of dispersion-shifted fibers used as optical fibers for SC light.

Although references 1 to 5 disclose generation of SC light, they do not give a clear clue as to selection of an optical fiber for SC light. That is, although chromatic dispersion plays an important role for an optical fiber for SC light, suitable dispersion in the optical fiber for SC light in the traveling direction of light and suitable dispersion slopes with wavelength at the respective positions are not disclosed. In practical generation of SC light, light having good characteristics can be selected in accordance with only experiment results.

The present invention has been made in consideration of the above situation, and has as its object to provide an optical fiber suitable for efficiently generating SC light having a large wavelength width and excellent flat characteristics in the wavelength width range, and a light source for efficiently outputting SC light having a large wavelength width and excellent flat characteristics in the wavelength width range.

An optical fiber according to the first manner is characterized in that the optical fiber receives pulse light having a predetermined wavelength to generate supercontinuum light and has a chromatic dispersion decreasing region which serves as a main region for generating the supercontinuum light and which starts with anomalous dispersion at least partially in a light propagation direction and in which dispersion decreases.

In the optical fiber of the first manner which serves as a nonlinear medium, when high peak pulse light is incident on the dispersion decreasing region, the refractive index for the light is changed by an optical Kerr effect, and self-phase modulation of a light wave occurs. As a result, a negative chirp having a long wavelength at the leading edge of pulse light and a short wavelength at the trailing edge of the pulse light is generated in the light wavelength distribution in the optical fiber. Light incident on the dispersion decreasing region propagates through the anomalous dispersion region at least in the initial period. In the anomalous dispersion region where the group velocity is lower at longer wavelengths, generation of a wavelength distribution and pulse compression simultaneously take place.

When the dispersion decreases in the longitudinal direction of the fiber, the compression is further efficiently occurred and the pulse peak power increases. The result causes the nonlinear optical phenomenon and the spectra is broadened.

The phenomenon such as self-phase modulation or four wave mixing by the optical Kerr effect produces light components having wavelengths within a wider wavelength range, and produces supercontinuum light. To more efficiently promote the mixing of four light waves light components having different wavelengths must interact with each other while being present at almost the same time and almost the same position. To perform such interaction more efficiently, it is preferable that the difference in group velocities between the light components having different wavelengths be small.

The optical fiber of the first manner has a chromatic dispersion decreasing region starting with anomalous dispersion in a light propagation direction, wherein SC light is generated in the dispersion decreasing region as the main part of SC light generation mainly in accordance with the generation of the self-phase modulation, the four wave mixing or the like.

The chromatic dispersion changes in the light propagation direction, and a kind of scanning of the zero-dispersion wavelengths is performed near the wavelengths of four light components subjected to mixing of four light waves. Therefore, four light waves having a wider variety of wavelengths tend to mix, and light having a wavelength in a wide wavelength range can be generated.

As a result, the optical fiber of the first manner generates SC light in a wide wavelength range.

A portion except the dispersion decreasing region preferably has the small absolute value of dispersion in the wavelength range of the SC light and uses a dispersion-flattened fiber having a dispersion slope of a small absolute to increase four wave mixing and the interaction length between the light components of the respective wavelengths contained in SC light.

An optical fiber of the second manner is characterized in that the chromatic dispersion value changes from a positive value to a negative value in the dispersion decreasing region in the optical fiber of the first manner.

According to the optical fiber of the third manner, the dispersion decreasing region may comprise a plurality of optical fibers having different chromatic dispersions in the optical fiber of the first manner, wherein the plurality of optical fibers are cascaded along the longitudinal direction.

The optical fiber or the third manner constitutes the optical fiber of the first manner by cascading the plurality of optical fibers having different chromatic dispersions in the longitudinal direction, thereby easily manufacturing the optical fiber of the first manner.

An optical fiber of the fourth manner comprises (i) a first optical fiber having a first average chromatic dispersion value that takes on a positive value and (ii) a second optical fiber having a second average chromatic dispersion value smaller than the first average chromatic dispersion value and a light incident end face connected to a light exit end face of the first optical fiber in the optical fiber of the first manner.

The optical fiber of the fourth manner constitutes the optical fiber of the first manner by comprising the first optical fiber having the first chromatic dispersion value that takes on a positive value, i.e., anomalous dispersion characteristics, and the second optical fiber cascaded with the first optical fiber on the downstream side in the light propagation direction and having the second chromatic dispersion value smaller than the first chromatic dispersion value.

Although a decrease in chromatic dispersion in the light propagation direction becomes discrete in the optical fiber of the fourth manner, the same effects as described with reference to the optical fiber of the first manner can be obtained in terms of generation of self-phase modulation, four wave mixing or the like.

Note that in the optical fiber of the fourth manner, an additional optical fiber having an appropriate chromatic dispersion value may be cascaded with the downstream side of the second optical fiber under the condition that the chromatic dispersion does not increase in the light propagation direction.

An optical fiber of the fifth manner is characterized in that a dispersion slope with wavelength in the supercontinuum light generation wavelength range at each position of the dispersion reducing range falls within the range of −0.1 (ps/nm$^2$/km) to 0.1 (ps/nm$^2$/km) in the optical fiber of the first manner.

In the optical fiber of the fifth manner, as the dispersion slope with wavelength in the supercontinuum light generation wavelength range at each position of the dispersion decreasing region falls within the range of −0.1 (ps/nm$^2$/km) to 0.1 (ps/nm$^2$/km), the difference in dispersion between the wavelengths at each position in the dispersion decreasing region is small. Therefore, the optical Kerr effect serving as the nonlinear optical effect is exhibited to generate SC light having a wide wavelength range.

From the viewpoint of generation of SC light having a wide wavelength range, the absolute value of the dispersion slope is preferably minimized. For example, a dispersion-flattened fiber having a dispersion slope value falling within the range of −0.04 (ps/nm$^2$/km) to 0.04 (ps/nm$^2$/km) is preferably used.

The absolute value is important for the dispersion slope. Even if dispersion slopes have different signs, if they have the same absolute value, their contributions to the wavelength width of SC light are identical.

An optical fiber of the sixth manner is characterized in that the dispersion slope changes from a positive value to a negative value, and vice versa in the dispersion decreasing region in the light propagation direction, and the group delay difference is smaller than that of the constant dispersion slope in the optical fiber of the first manner.

In the optical fiber of the sixth manner, the dispersion slope in the dispersion decreasing region is changed to an extent that the polarity changes in the light propagation direction. Therefore, the group delay difference in the dispersion decreasing region becomes smaller than that of the constant dispersion slope.

As a result, overlapping of the light components having the respective wavelengths in the time domain increases, and SC light can be efficiently generated.

An optical fiber of the seventh manner is characterized in that the dispersion decreasing region has a zero-dispersion wavelength in the 1.5-$\mu$m band in the optical fiber of the first manner.

In use of an optical fiber mainly containing silica glass, light having a wavelength in the 1.5-$\mu$m band with a low transmission loss is frequently used as light transmitted through an optical fiber. From the viewpoint of prevention of waveform distortion due to chromatic dispersion, an optical fiber having a zero-dispersion wavelength in the 1.5-$\mu$m band is used as an optical fiber.

Since the optical fiber of the seventh manner satisfies the conditions of the first manner and has a zero-dispersion wavelength in the 1.5-$\mu$m band, the influence of chromatic dispersion on the SC light components having wavelengths in the 1.5-$\mu$m band is reduced, and a suitable SC light output can be obtained.

The optical fiber of the first manner is not limited to the optical fiber of the seventh manner having a zero-dispersion wavelength. For example, the zero-dispersion wavelength is preferably set at a wavelength in the 1.3-$\mu$m band to generate SC light in the 1.3-$\mu$m band.

SC light in the 1.3- or 1.5-$\mu$m band can be generated by setting the zero-dispersion wavelength to that of 1.3- or 1.5$\mu$m band.

An optical fiber of the eighth manner is characterized in that the dispersion decreasing region has polarization-maintaining characteristics.

The degree of exhibition of the nonlinear optical effect depends on the composition of the medium material and the direction of the polarization plane of propagated light. When optical pulses are input to the optical fiber of the eighth manner having polarization-maintaining characteristics at time intervals under the same conditions, a similar nonlinear optical effect is exhibited to stably generate SC light.

In mixing of four light waves, when two interacting light components have the same polarization plane direction, the four waves can be mixed best. Since the optical fiber of the sixth manner maintains the polarization plane during generation of SC light, light of each wavelength generated by self-phase modulation or four wave mixing has a similar polarization direction, thereby efficiently generating SC light.

An optical fiber of the ninth manner is characterized in that, in the dispersion decreasing region, if $n_2$, Aeff, and Ppeak respectively represent a nonlinear refractive index, an effective sectional area of a core, and a peak power of the incident pulse light in the optical fiber of the first manner, the following relation holds:

$$(n_2/Aeff) \cdot Ppeak > 0.03 \times 10^{-8} (1/W) \times 1.5(W) = 0.045 \times 10^{-8} \quad (1)$$

A refractive index n is a function of a power level P of input light and expressed as follows:

$$n(P) = n0 + (n_2/Aeff) \cdot P \quad (2)$$

where n0: 0th-order refractive index As $(n_2/Aeff) \cdot P$ increases, the degree of exhibition of the nonlinear optical effect increases, thereby efficiently generating SC light. Assume that the power level P of the input light is kept unchanged. In this case, as $(n_2/Aeff)$ increases, the degree of exhibition of the nonlinear optical effect increases, thereby efficiently generating SC light.

Since in the optical fiber of the ninth manner $(n_2/Aeff) \cdot Ppeak > 0.045 \times 10^{-8}$ holds, SC light can be efficiently generated at a wavelength width of several 10 nm or more. A peak power level Ppeak easily obtained by use of a normal semiconductor laser and a normal optical fiber amplifier is about 1.5 (W), so SC light can be efficiently generated at a wavelength width of several 10 nm or more, provided that $(n_2/Aeff) > 0.03$ (1/W).

A light source apparatus of the tenth manner comprises (a) a pulse light generation means for generating high peak pulse light having a predetermined wavelength and (b) the optical fiber of the fifth manner for receiving the high peak pulse light generated by the pulse light generation means and generating supercontinuum light.

In the light source apparatus of the tenth manner, the pulse light generation means generates the high peak pulse light having the predetermined wavelength and supplies it to the optical fiber of the first manner. When the high peak pulse light is input to and travels in the optical fiber of the first manner, SC light is generated as described above and output as an output from the light source.

A light source apparatus of the eleventh manner is characterized by comprising (i) a pulse light generator for generating short pulse light and (ii) an optical amplifier for receiving the short pulse light output from the pulse light generator, amplifying the short pulse light, and outputting the amplified light in the light source apparatus of the tenth manner.

In the light source apparatus of the eleventh manner, in generation of high peak pulse light, the pulse light generator generates the short pulse light, and the optical amplifier amplifies the short pulse light, thereby obtaining the high peak pulse light. The pulse light generator alone need not generate high peak pulse light, thereby easily realizing a light source for outputting SC light.

Further, the optical fibers can be used for generating non-linear light such as idler wave light.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
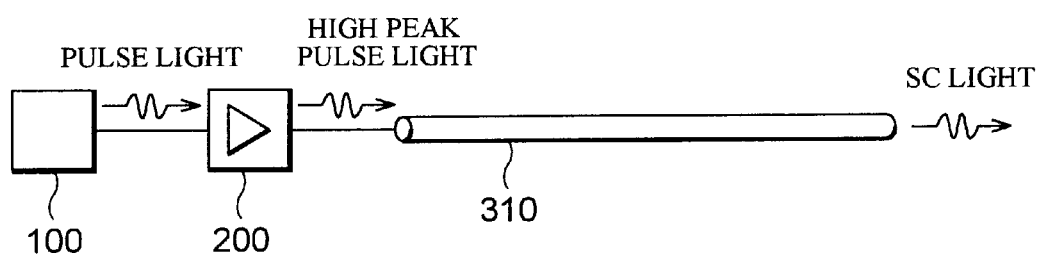
FIG. 1 is a view showing the structure of a light source apparatus according to the first embodiment.

The preferred embodiments of optical fibers and light source apparatuses according to the present invention will be described with reference to the accompanying drawings. The same reference numerals denote the same parts throughout the drawings, and a repetitive description thereof will be omitted.

First Embodiment

FIG. 1 is a view showing the structure of a light source apparatus according to the first embodiment of the present invention. As shown in FIG. 1, this apparatus comprises (a) an optical pulse generator 100 for generating pulse light having a predetermined wavelength, (b) an optical amplifier 200 for receiving pulse light output from the optical pulse generator 100, amplifying the pulse light, and outputting high peak pulse light, and (c) an optical fiber 310 for receiving the high peak pulse light output from the optical amplifier 200, generating SC light by propagating the input light therethrough, and outputting the SC light.

Figure 2:
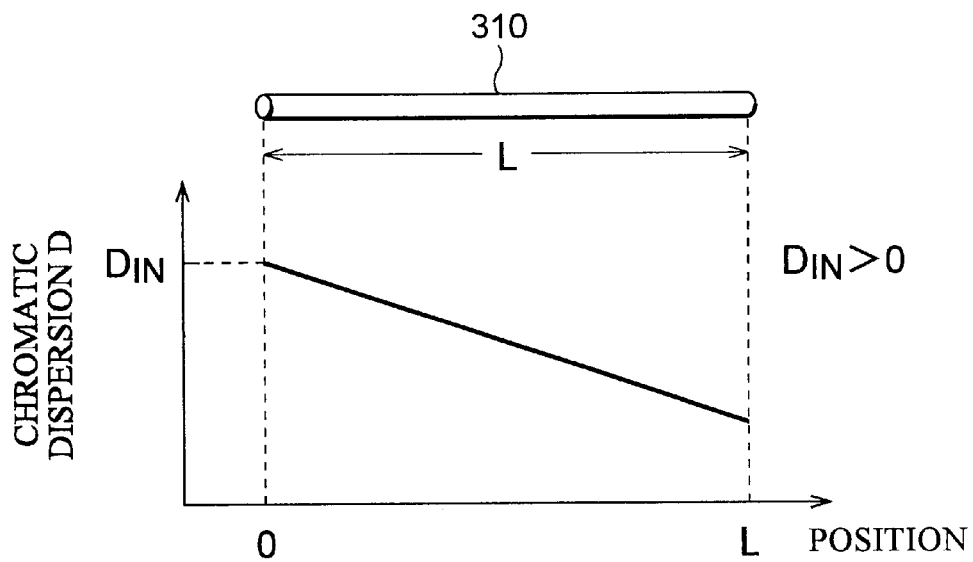
FIG. 2 is a view for explaining an optical fiber 310 used in the first embodiment.

FIG. 2 is a view showing the structure of the optical fiber 310, i.e., the chromatic dispersion distribution in the longitudinal direction (light propagation direction). As shown in FIG. 2, in the optical fiber 310, a dispersion $D_{TU}$ at the incident end which receives the high peak pulse light from the optical amplifier 200 has a positive value, and a chromatic dispersion D linearly decreases along the longitudinal direction.

In the light source apparatus of this embodiment, the optical pulse generator 100 generates short pulse light having a predetermined wavelength. The short pulse light output from the optical pulse generator 100 is input to the optical amplifier 200 and output as the high peak pulse light. The high peak pulse light output from the optical amplifier 200 is input to the optical fiber 310.

When the high peak pulse light is input to the optical fiber 310, the refractive index for the light is changed by the optical Kerr effect to cause self-phase modulation of the light wave.

As a result, a light wavelength distribution is formed in the pulse light in the optical fiber 310. The light input to the optical fiber 310 propagates in an anomalous dispersion region in which the chromatic dispersion has a positive value. In the anomalous dispersion region where the group velocity is lower at longer wavelengths, pulse compression progresses. When the dispersion decreases in the longitudinal direction, the pulse is compulsorily compressed and the peak power increases, thereby promoting the nonlinear optical effect to cause the spectra broaden.

The compressed optical pulses contain light components having wavelengths within a given wavelength range. During the dispersion value is varying from a positive-value to a negative-value, the light is much effected by the four wave mixing by the optical Kerr effect to generate light having wider wavelength range, thereby generating SC light.

As shown in FIG. 2, the optical fiber 310 has a chromatic dispersion D as a function of a position Z in the propagation direction, and this function is expressed as follows:

$$D(Z) = D_{IN} - (\Delta D) \cdot Z \tag{3}$$

As light travels farther, the broadening of spectra caused by self-phase modulation becomes harder to occur. The phase difference between light components having different wavelengths is gradually reduced during propagation. The chromatic dispersion D does not depend on the position Z in the propagation direction, and overlapping of the light components having different wavelengths as a function of time increases, as compared with the following case:

$$D(Z) = D_{IN} \tag{4}$$

thereby efficiently allowing mixing of four light waves.

More specifically, the optical fiber 310 has a dispersion decreasing region started with anomalous dispersion and having a gradually reduced chromatic dispersion, and nonlinear optical phenomena such as four wave mixing or self-phase modulation and pulse compression caused by the anomalous dispersion cause the generation of SC light in the dispersion decreasing region as a main part for SC light generation.

The chromatic dispersion changes in the light propagation direction, and a kind of scanning of zero-dispersion wavelength is performed near the wavelengths of four light components subjected to mixing of four light waves. Therefore, four light waves having a wider variety of wavelengths tend to mix, and light having a wavelength in a wide wavelength range can be generated.

In this embodiment, it is preferable that the absolute value of the dispersion slope of an optical fiber be small. When the absolute value of the dispersion slope is small, overlapping of light components having different wavelengths increases as a function of time, and therefore four wave mixing occurs more readily.

As the absolute value of an integral value associated with the dispersion slope in the longitudinal direction decreases, overlapping of light components having different wavelengths increases as a function of time, thereby easily mixing four light waves.

The chromatic dispersion value in the dispersion decreasing region preferably changes from a positive value to a negative value.

When the chromatic dispersion value is a positive value in a fiber having a positive dispersion slope in a predetermined wavelength range, light having a wavelength shorter than that of the incident high peak pulse light is likely to be generated. When the chromatic dispersion value is a negative value, light having a wavelength longer than that of the incident high peak pulse light is likely to be generated.

Since the chromatic dispersion value in the dispersion decreasing region changes from a positive value to a negative value, lights having shorter and longer wavelengths than that of the incident high peak pulse light can be efficiently generated. Therefore, SC light can be generated within a wide wavelength range.

The Kerr effect that is a nonlinear optical effect which causes self-phase modulation and four wave mixing tends to exhibit itself more easily as the nonlinear refractive index and the light intensity density increase. To obtain a wavelength width of several 10 nm or more, if $n_2$, Aeff and Ppeak respectively represent the nonlinear refractive index, effective sectional area of a core, and the peak power of high peak pulse light, the following relation must hold:

$$(n_2/Aeff) \cdot Ppeak > 0.03 \times 10^{-31\ 8}(1/W) \times 1.5\ (W) = 0.045 \times 10^{-8} \quad (1)$$

Figure 3:
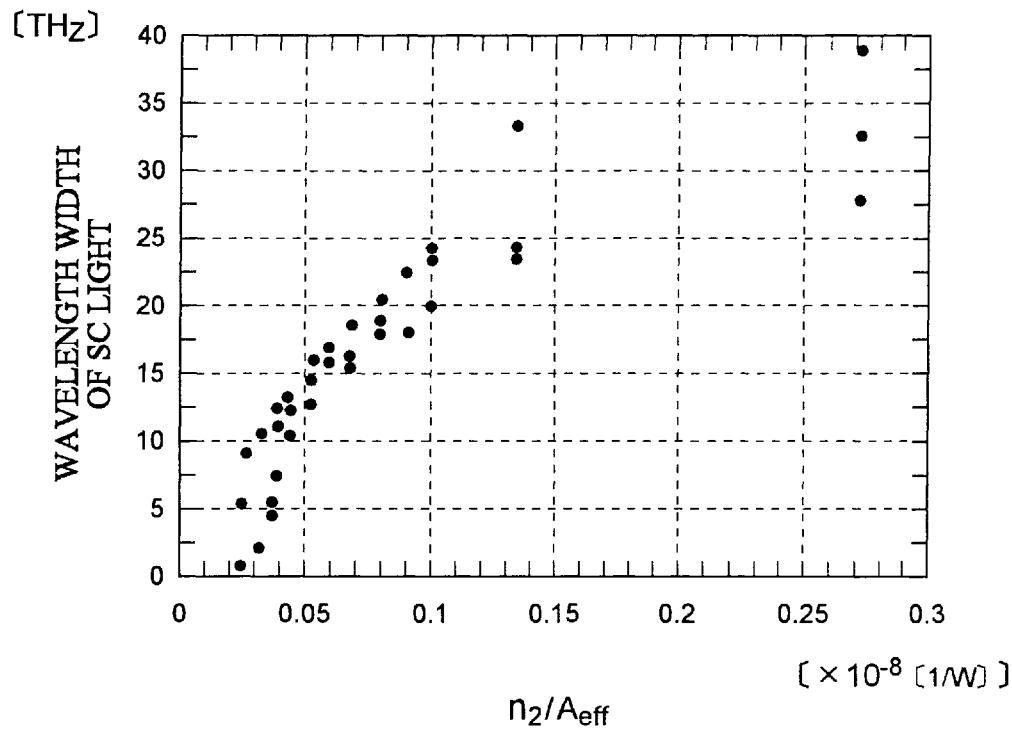
FIG. 3 is a graph showing the relationship between the wavelength width of SC light and the ratio of the nonlinear diffractive index to the effective sectional area of a core.

FIG. 3 is a graph showing the relationship between the wavelength width of SC light and the ratio of the nonlinear refractive index $n_2$ to the effective sectional area Aeff of the core when the peak power Ppeak of the high peak pulse light is 1.5 (W). In the following description, the length of an aptical fiber and the dispersion slope are represented as L and $D_{slop}$ respectively.

In the actual measurement, an optical fiber having the following characteristics was used as the optical fiber 320:
$D_{IN}$=1 to 4 (pϵ/nm/km)
ΔD−0.5 to 2 (ps/nm/km$^2$)
$D_{slop}$=0.035 (ps/nm$^2$/km)
L=3 (km)

The high peak pulse light input to the optical fiber 310 had the following characteristics:
Central Wavelength (λ0) of Pulse=1,550 (nm)
Pulse Peak Power=1.5 (W)
Pulse Width=3.5 (ps) (full-width at half maximum)

Combining of $D_{IN}$ and ΔD in various ways, the values of the ratio of the nonlinear refractive index $n_2$ to the effective sectional area Aeff of the core and the wavelength widths of SC light were calculated.

Judging from FIG. 3, when $n_2$/Aeff>0.03×10$^{-8}$ (1/W) was satisfied at the peak power Ppeak of 1.5 (W), sc light having a displacement width wf of the optical frequency of about 5,000 (GHz) or more was generated and output.

The relationship between the displacement width wf of the optical frequency and a wavelength range wλ is expressed as follows:

$$w\lambda \sim (\lambda 02/C) \cdot wf \quad (5)$$

where C: velocity of light
When the displacement width wf of the optical frequency and the wavelength range wλ are expressed in (THz) and (nm) units, given λ0=1,550 (nm), we have:

$$w\lambda \sim 8wf \quad (6)$$

More specifically, when $n_2$/Aeff>0.03×10$^{-8}$ (1/W) at the peak power Ppeak of 1.5 (W), SC light having a wavelength width of about 40 nm or more is output.

In this embodiment, the optical fiber 310 preferably has polarization-maintaining characteristics, and is comprised of a polarization-maintaining optical fiber (for example PANDA fiber). In mixing of four light waves, when two interacting light components have the same polarization direction, the four waves can be mixed best.

The light source apparatus of this embodiment will be described in detail by way of its examples.

EXAMPLE 1

Figure 4:
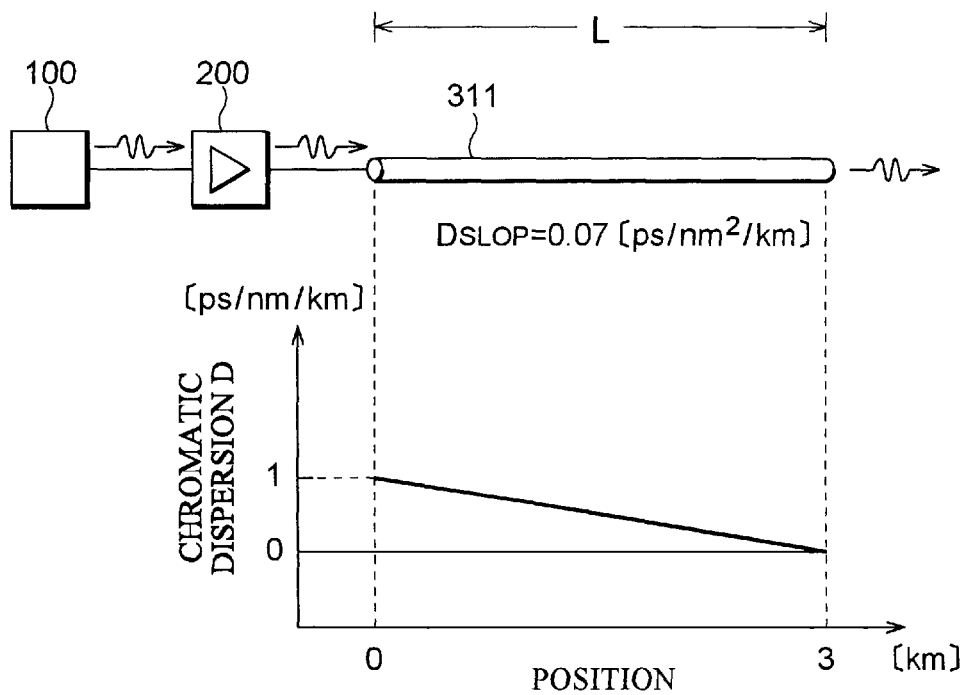
FIG. 4 is a view showing the structure of a light source apparatus of Example 1.

FIG. 4 is a view showing the structure of a light source apparatus of Example 1. As shown in FIG. 4, this apparatus comprises (a) an optical pulse generator 100 for generating pulse light having a predetermined wavelength, (b) an optical amplifier 200 for receiving pulse light output from the optical pulse generator 100, amplifying the pulse light, and outputting high peak pulse light, and (c) an optical fiber 311 for receiving the high peak pulse light output from the optical amplifier 200, generating SC light by propagating the input light therethrough, and outputting the SC light.

The optical fiber 311 comprises a dispersion-shifted fiber having the following characteristics:
$D_{IN}$−1 (ps/nm/km)
ΔD=⅓ (ps/nm/km$^2$)
$D_{slop}$=0.07 (ps/nm$^2$/km)
L=3 (km)
$n_2$=2.0×10$^{-20}$ (m$^2$/W)
Aeff=50 (μm$^2$)

Figure 5A:
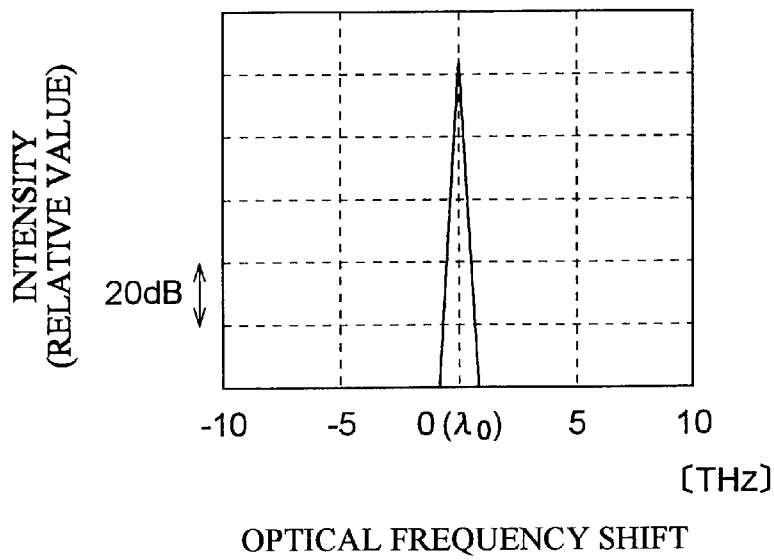
FIGS. 5A and 5B are graphs showing the spectra of high peak pulse light and generated SC light in the light source apparatus of Example 1.
Figure 5B:
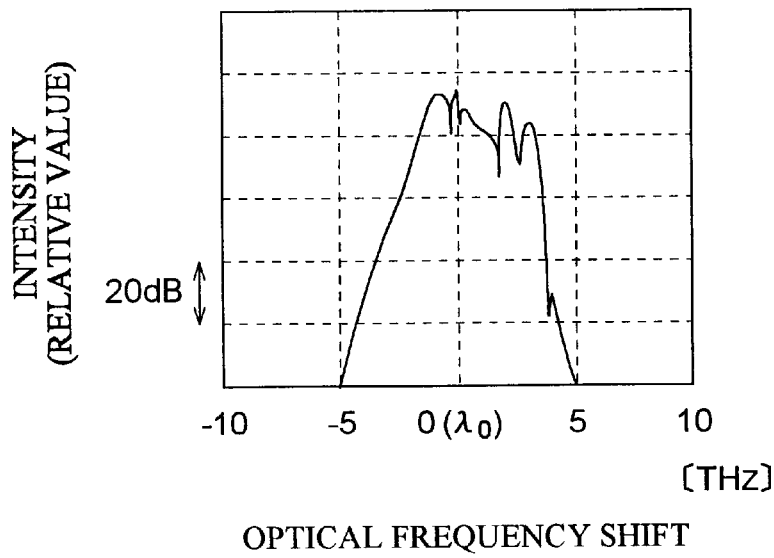

FIGS. 5A and 5B are graphs showing the spectra of high peak pulse light and SC light in Example 1. FIG. 5A is a graph showing the spectra of the high peak pulse light input to the optical fiber 311, whereas FIG. 5B is a graph showing the spectra of SC light output from the optical fiber 311.

The high peak pulse light input to the optical fiber 311 had the spectral distribution shown in FIG. 5A and the following characteristics:
Central Wavelength (λ0) of Pulse=1,550 (nm)
Pulse Peak Power=1.5 (W)
Pulse Width=3.5 (ps) (full-width at half maximum)

As shown in FIG. 5B, the light source apparatus of Example 1 generated and output SC light in which the displacement width wf of the optical frequency of the flat peak portion in the output spectra near the wavelength=1, 550 (μm) was about 5,000 (GHz). That is, the light source apparatus of Example 1 output SC light having a wavelength width of about 40 nm.

EXAMPLE 2

Figure 6:
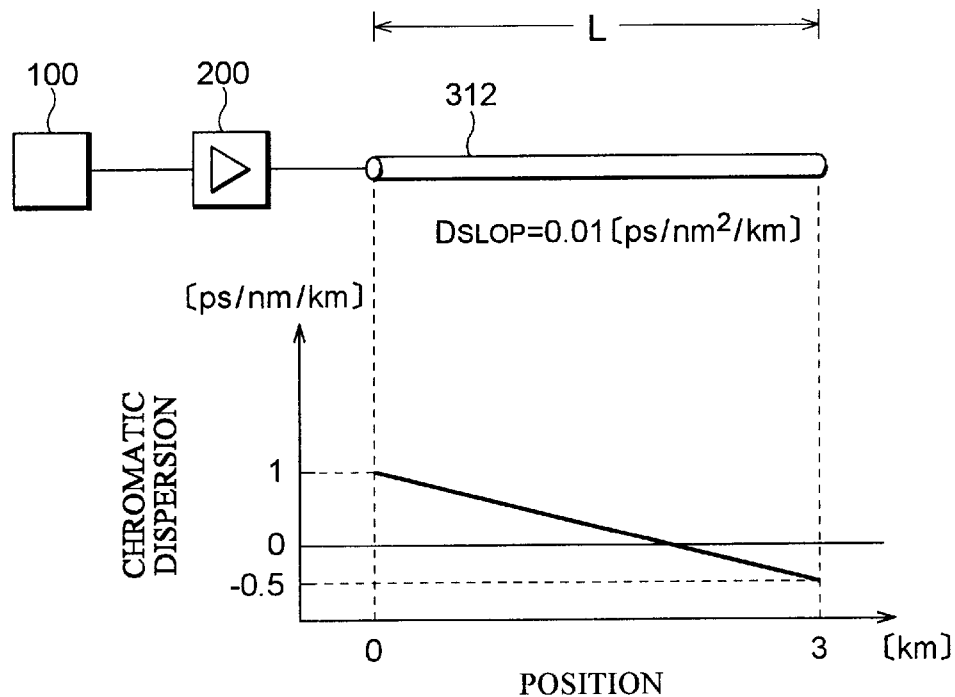
FIG. 6 is a view showing the structure of a light source apparatus of Example 2.

FIG. 6 is a view showing the structure of a light source apparatus of Example 2. As shown in FIG. 6, this apparatus comprises (a) an optical pulse generator 100 for generating pulse light having a predetermined wavelength, (b) an optical amplifier 200 for receiving pulse light output from the optical pulse generator 100, amplifying the pulse light, and outputting high peak pulse light, and (c) an optical fiber 312 for receiving the high peak pulse light output from the optical amplifier 200, generating SC light by propagating the input light therethrough, and outputting the SC light.

The optical fiber 312 comprises a dispersion-flattened fiber having the following characteristics:

$D_{IN}$=1 (ps/nm/km)
$\Delta D$=0.5 (ps/nm/km$^2$)
$D_{slop}$=0.01 (ps/nm$^2$/km)
L=3 (km)
$n_2$=2.0×10$^{-20}$ (m$^2$/W)
Aeff=50 ($\mu$m$^2$)

Figure 7:
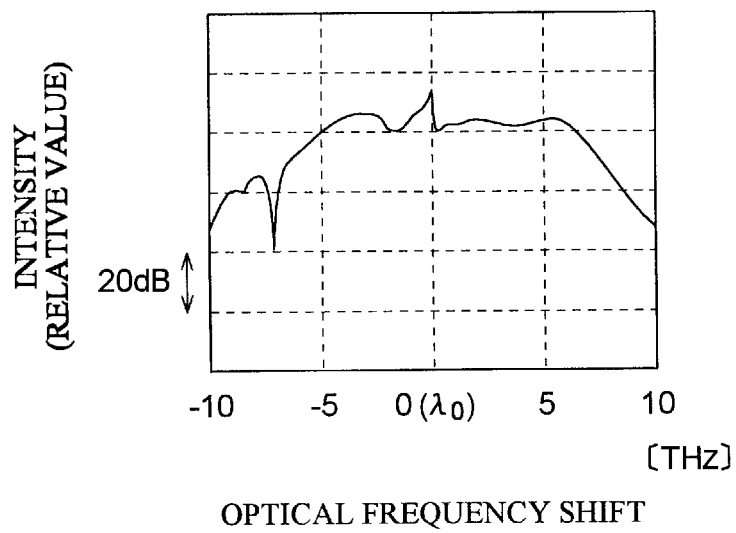
FIG. 7 is a graph showing the spectra of SC light generated by the light source apparatus of Example 2.

FIG. 7 is a graph showing the spectra of SC light output from the optical fiber 312. The high peak pulse light input to the optical fiber 312 was identical to that of Example 1.

As shown in FIG. 7, the light source apparatus of Example 2 generated and output SC light in which the displacement width wf of the optical frequency of the flat peak portion in the output spectra near the wavelength=1,550 ($\mu$m) was about 12,000 (GHz). That is, the light source apparatus of Example 2 output SC light having a wavelength width of about 96 nm.

In Example 2, the wavelength width of the SC light became larger than that in Example 1.

EXAMPLE 3

Figure 8:
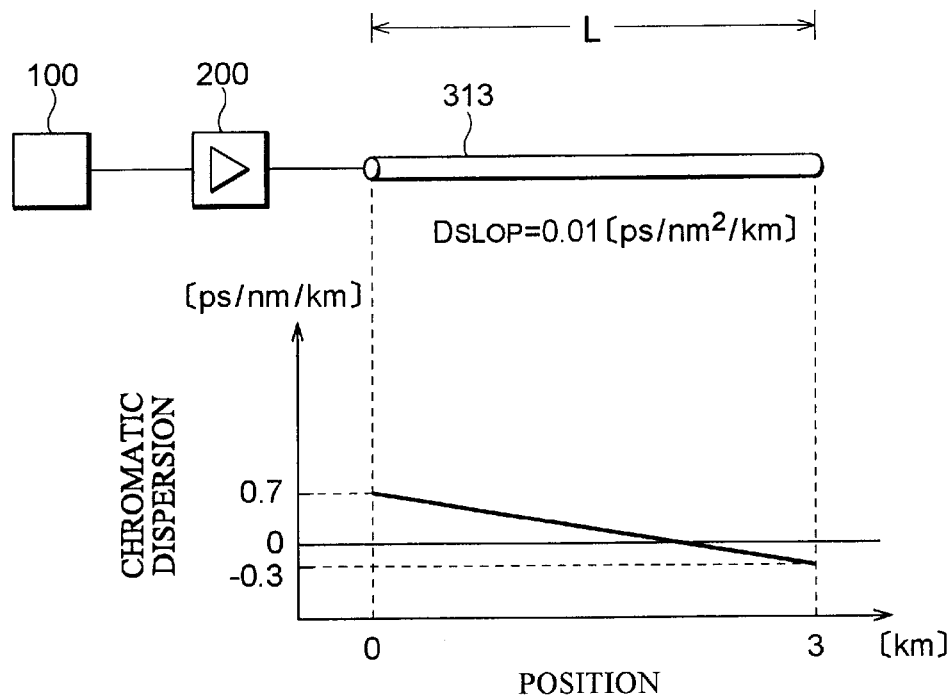
FIG. 8 is a view showing the structure of a light source apparatus of Example 3.

FIG. 8 is a view showing the structure of a light source apparatus of Example 3. As shown in FIG. 8, this apparatus comprises (a) an optical pulse generator 100 for generating pulse light having a predetermined wavelength, (b) an optical amplifier 200 for receiving pulse light output from the optical pulse generator 100, amplifying the pulse light, and outputting high peak pulse light, and (c) an optical fiber 313 for receiving the high peak pulse light output from the optical amplifier 200, generating SC light by propagating the input light therethrough, and outputting the SC light.

The optical fiber 313 comprises a dispersion-flattened fiber having the following characteristics:

$D_{IN}$=0.7 (ps/nm/km)
$\Delta D$⅓(ps/nm/km$^2$)
$D_{slop}$=0.01 (ps/nm$^2$/km)
L=3 (km)
$n_2$=2.0×10$^{-20}$ (m$^2$/W)
Aeff=50 ($\mu$m$^2$)

Figure 9:
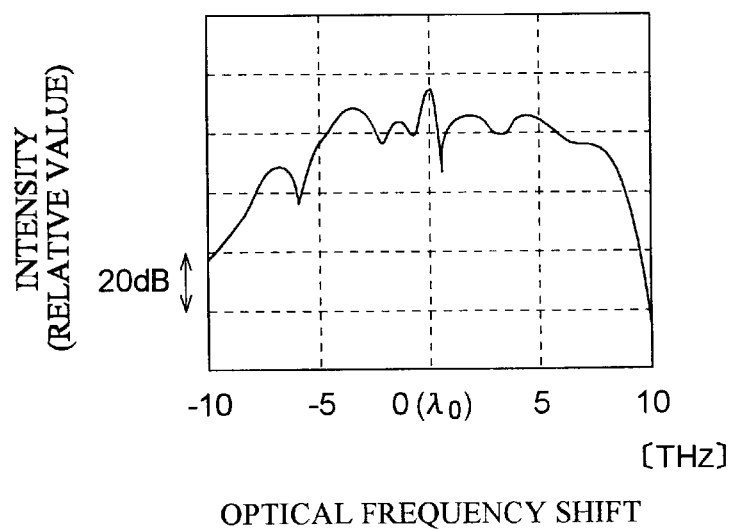
FIG. 9 is a graph showing the spectra of SC light generated by the light source apparatus of Example 3.

FIG. 9 is a graph showing the spectra of SC light output from the optical fiber 313. The high peak pulse light input to the optical fiber 313 was identical to that of Example 1.

As shown in FIG. 9, the light source apparatus of Example 3 generated and output SC light in which the displacement width wf of the optical frequency of the flat peak portion (within about ±5 (dB)) in the output spectra near the wavelength=1,550 ($\mu$m) was about 10,000 (GHz). That is, the light source apparatus of Example 3 output SC light having a wavelength width of about 80 nm.

In Example 3, the wavelength width of the SC light became larger than that in Example 1 as in Example 2.

EXAMPLE 4

Example 4 systematically measured the relationship between the wavelength width of SC light and the dispersion slope $D_{slop}$.

Figure 10:
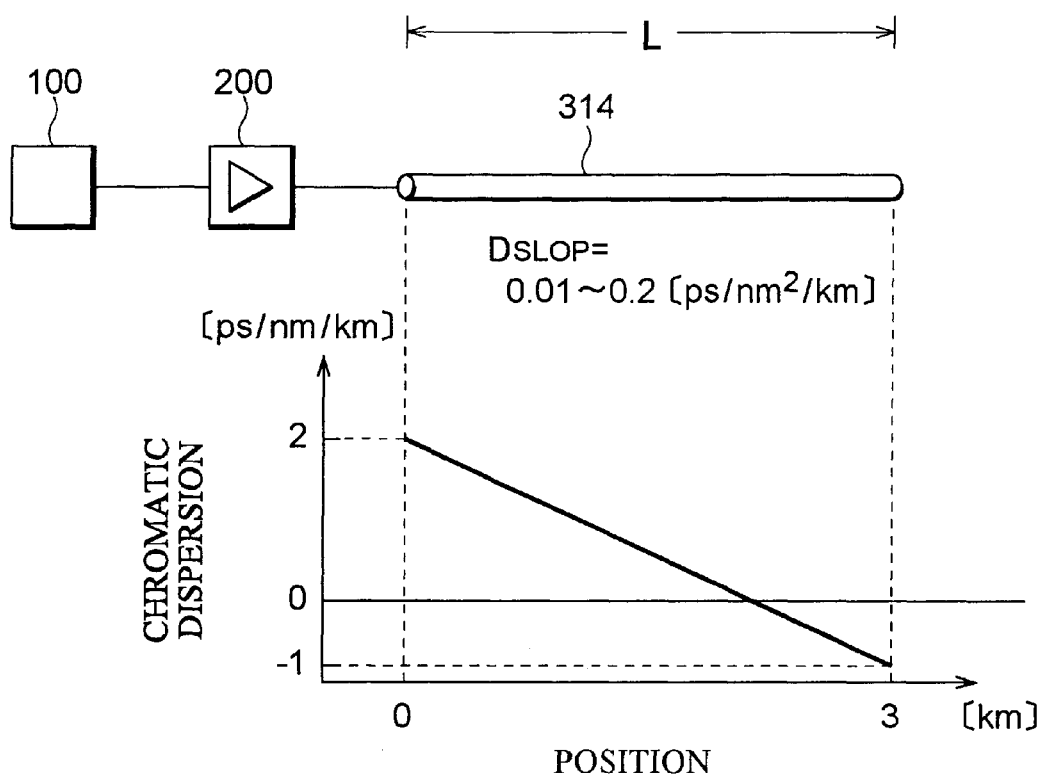
FIG. 10 is a view showing the structure of a light source apparatus of Example 4.
Figure 11B:
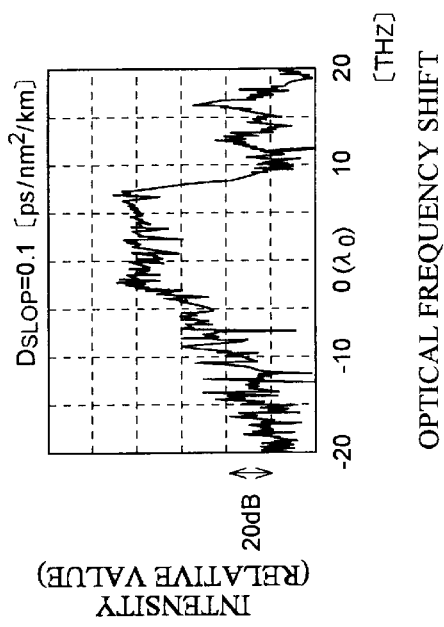
FIGS. 11A to 11D are graphs showing the spectra of SC light generated by the light source apparatus of Example 4.
Figure 11D:
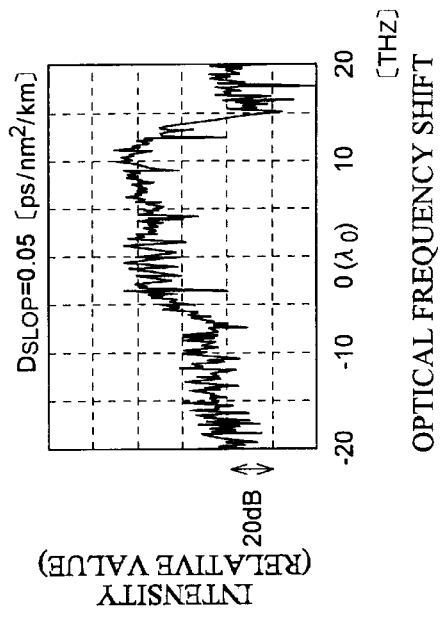
Figure 11A:
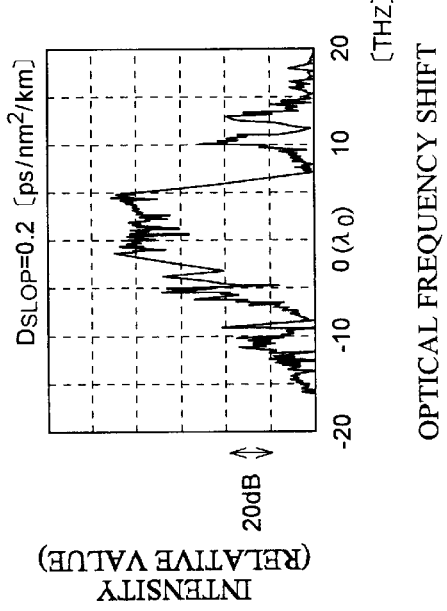
Figure 11C:
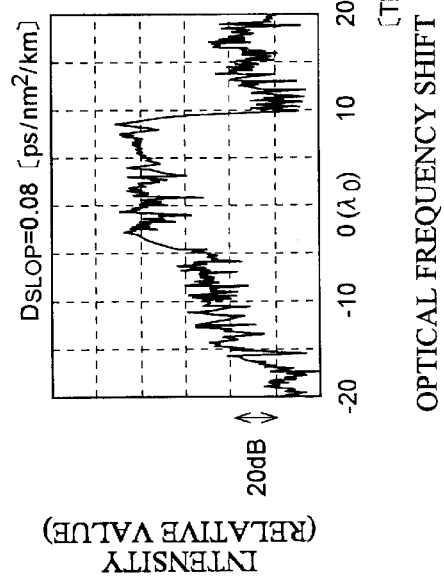
Figure 12A:
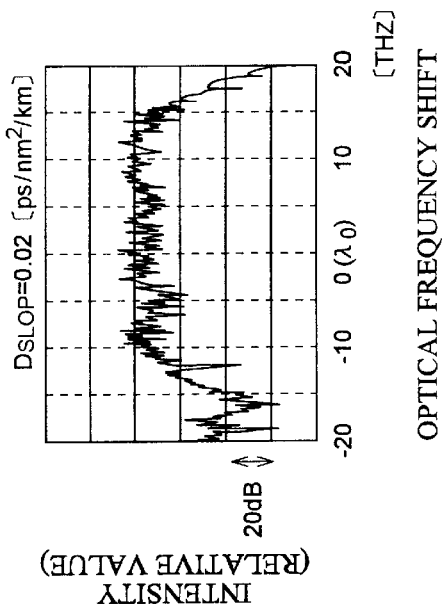
FIGS. 12A to 12C are graphs showing the spectra of SC light generated by the light source apparatus of Example 4.
Figure 12B:
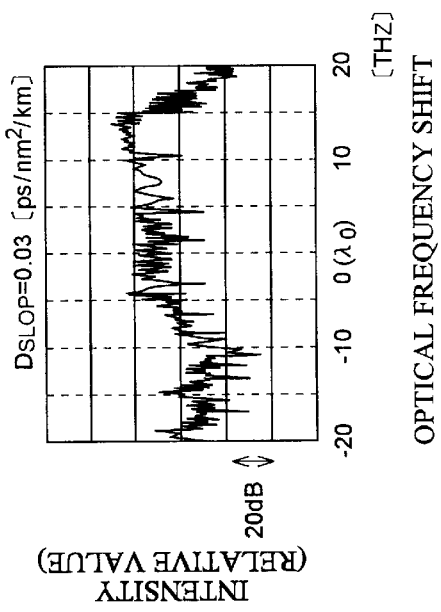
Figure 12C:
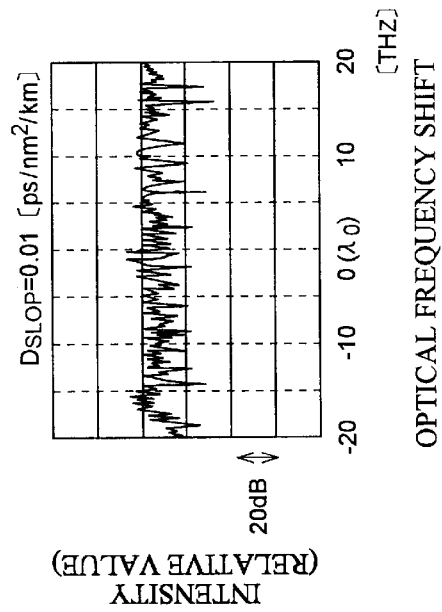

FIG. 10 is a view showing the structure of a light source apparatus of Example 4. As shown in FIG. 10, this apparatus comprises (a) an optical pulse generator 100 for generating pulse light having a predetermined wavelength, (b) an optical amplifier 200 for receiving pulse light output from the optical pulse generator 100, amplifying the pulse light, and outputting high peak pulse light, and (c) an optical fiber 314 for receiving the high peak pulse light output from the optical amplifier 200, generating SC light by propagating the input light therethrough, and outputting the SC light.

The optical fiber 314 comprises a dispersion-flattened fiber having the following characteristics:

$D_{IN}$=2 (ps/nm/km)
$\Delta D$=1 (ps/nm/km$^2$)
$D_{slop}$=0.01 to 0.2 (ps/nm$^2$/km)
L=3 (km)
$n_2$=6.0×10$^{-20}$ (m$^2$/W)
Aeff=10 ($\mu$m$^2$)

FIGS. 11A to 11D and 12A to 12C are graphs showing the spectra of SC light output from the optical fiber 314. FIGS. 11A, 11B, 11C, 11D, 12A, 12B, and 12C show the spectra for $D_{slop}$—0.2, 0.1, 0.08, 0.05, 0.03, 0.02, and 0.01, respectively. Note that the high peak pulse light input to the optical fiber 314 was identical to that in Example 1.

As shown in FIGS. 11A to 11D and 12A to 12C, the light source apparatus of Example 4 generated and output SC light in which the displacement width wf of the optical frequency of the flat peak portion in the output spectra near the wavelength=1,550 ($\mu$m) and at $D_{slop}$ of 0.1 or less was about 10,000 (GHz). That is, the light source apparatus of Example 3 output SC light having a wavelength width of about 80 nm at a $D_{slop}$ of 0.1 or less.

EXAMPLE 5

Figure 13:
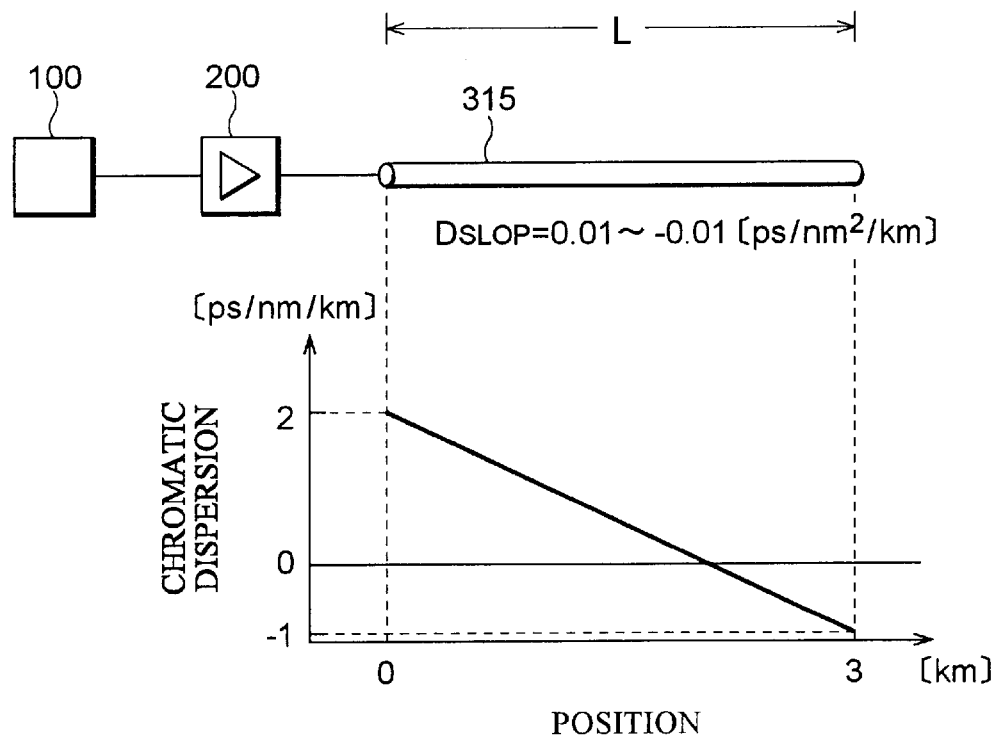
FIG. 13 is a view showing the structure of a light source apparatus of Example 5.

FIG. 13 is a view showing the structure of a light source apparatus of Example 5. As shown in FIG. 13, this apparatus comprises (a) an optical pulse generator 100 for generating pulse light having a predetermined wavelength, (b) an optical amplifier 200 for receiving pulse light output from the optical pulse generator 100, amplifying the pulse light, and outputting high peak pulse light, and (c) an optical fiber 315 for receiving the high peak pulse light output from the optical amplifier 200, generating SC light by propagating the input light therethrough, and outputting the SC light.

The optical fiber 315 comprises a dispersion-flattened fiber having the following characteristics:

$D_{IN}$=2 (ps/nm/km)
$\Delta D$=1 (ps/nm/km$^2$)
$D_{slop}$=0.01 to −0.01 (ps/nm$^2$/km) (linearly decreased)
L=3 (km)
$n_2$=3.0×10$^{-20}$ (m$^2$/W)
Aeff=50 ($\mu$m$^2$)

Figure 14:
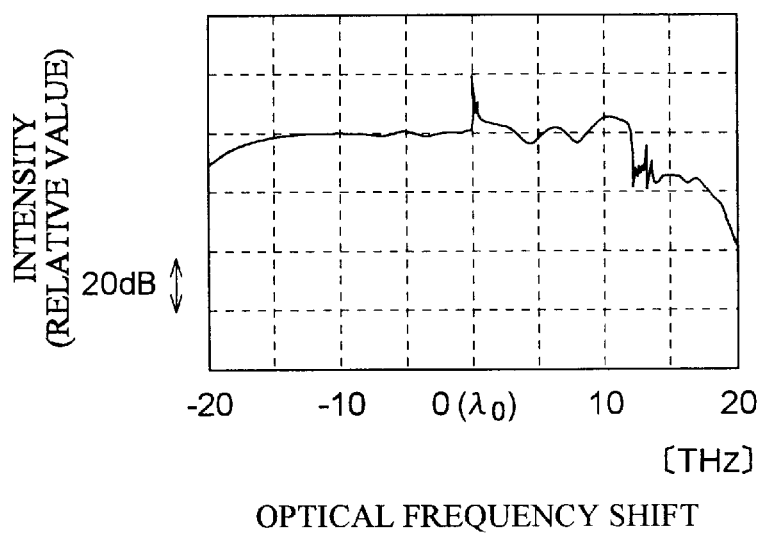
FIG. 14 is a graph showing the spectra of SC light generated by the light source apparatus of Example 5.

FIG. 14 is a graph showing the spectra of SC light output from the optical fiber 315. The high peak pulse light input to the optical fiber 315 was identical to that of Example 1.

As shown in FIG. 14, the light source apparatus of Example 2 generated and output SC light in which the displacement width wf of the optical frequency of the flat peak portion in the output spectra near the wavelength=1,550 ($\mu$m) was about 30,000 (GHz). That is, the light source apparatus of Example 5 output SC light having a wavelength width of about 240 nm.

Second Embodiment

Figure 15:
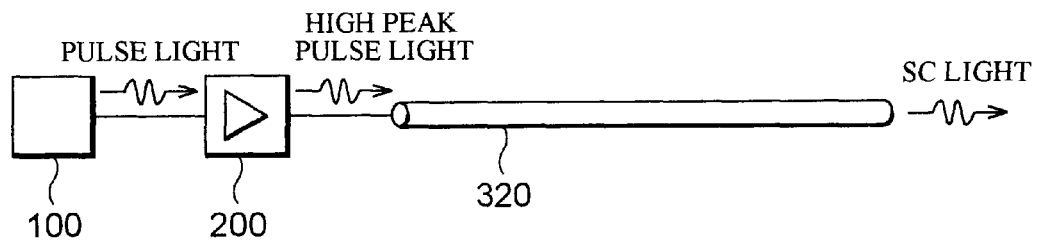
FIG. 15 is a view showing the structure of a light source apparatus according to the second embodiment.

FIG. 15 is a view showing the structure of a light source apparatus according to the second embodiment of the present invention. As shown in FIG. 15, this apparatus comprises (a) an optical pulse generator 100 for generating pulse light having a predetermined wavelength, (b) an optical amplifier 200 for receiving pulse light output from the optical pulse generator 100, amplifying the pulse light, and outputting high peak pulse light, and (c) an optical fiber 320 for receiving the high peak pulse light output from the optical amplifier 200, generating SC light by propagating the input light therethrough, and outputting the SC light.

Figure 16:
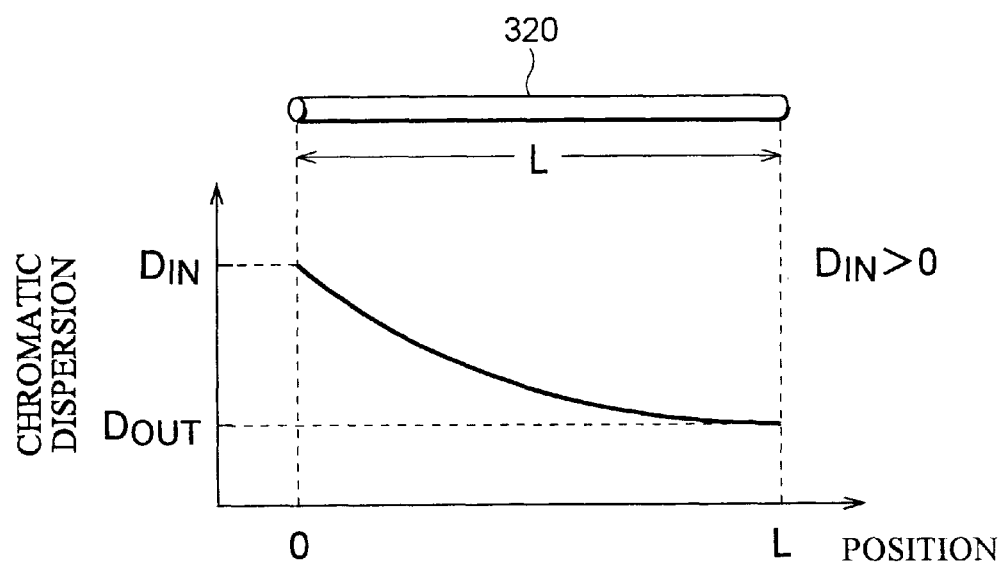
FIG. 16 is a view showing the structure of an optical fiber 320 used in the second embodiment.

FIG. 16 is a graph showing the chromatic dispersion distribution in the longitudinal direction (light propagation direction) of the optical fiber 320.

The second embodiment is the same as the first embodiment in that the chromatic dispersion $D_{TM}$ of the high peak pulse light from the optical amplifier 200 at the incident end has a positive value, as shown in FIG. 16, but the second embodiment is different from the first embodiment in that the chromatic dispersion D nonlinearly decreases along the longitudinal direction.

As in the first embodiment, in the light course apparatus of the second embodiment, the short pulse light generated by the optical pulse generator 100 is input to the optical amplifier 200, amplified, and output as high peak pulse light. The high peak pulse light output from the optical amplifier 200 is input to the optical fiber 320.

As in the first embodiment, when the high peak pulse light is input to the optical fiber 320, the refractive index for the light is changed by the optical Kerr effect, thereby causing self-phase modulation.

As a result, the wavelength distribution of the light is formed in the light pulse in the optical fiber 320. The light input to the optical fiber 320 propagates in an anomalous dispersion region in which the chromatic dispersion has a positive value. For this reason, in the anomalous dispersion region where the group velocity is lower at longer wavelengths, pulse compression progresses. When the dispersion decreases in the longitudinal direction, the pulse is compulsorily compressed and the peak power increases, thereby promoting the nonlinear optical effect to cause the spectra broaden.

The compressed optical pulses contain light components having wavelengths within a given wavelength range. During the dispersion value is varying from a positive-value to a negative-value, the light is much effected by the four wave mixing by the optical Kerr effect to generate light having wider wavelength range, thereby generating SC light.

In this embodiment, it is preferable that the absolute value of the dispersion slope of an optical fiber be small as in the first embodiment. When the absolute value of an integral value associated with the dispersion slope in the longitudinal direction decreases, overlapping of light components having different wavelengths increases as a function of time, thereby easily mixing four light waves as in the first embodiment.

As in the first embodiment, the Kerr effect that is a nonlinear optical effect which causes self-phase modulation and four wave mixing tends to exhibit itself more easily as the nonlinear refractive index and the light intensity density increase. To obtain a wavelength width of several 10 nm or more, if $n_2$, Aeff and Ppeak respectively represent the nonlinear refractive index, effective sectional area of a core, and the peak power of high peak pulse light, the following relation must hold:

$$(n_2/Aeff) \cdot Ppeak > 0.03 \times 10^{-8} \ (1/W) \times 1.5 \ (W) = 0.045 \times 10^{-8} \quad (1)$$

In this embodiment, the optical fiber 320 preferably has polarization-maintaining characteristics, and is comprised of a polarization-maintaining optical fiber as in the first embodiment. In mixing of four light waves, when two interacting light components have the same polarization direction, the four waves can be mixed best.

The light source apparatus of this embodiment will be described in detail by way of its example.

EXAMPLE 6

Figure 17:
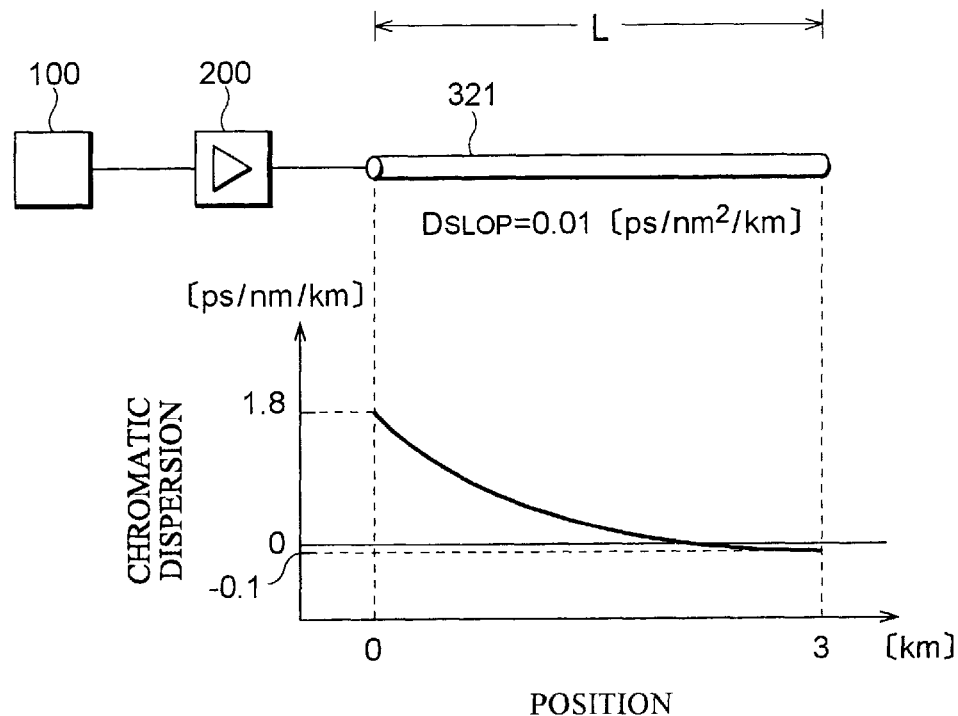
FIG. 17 is a view showing the structure of a light source apparatus of Example 6.

FIG. 17 is a view showing the structure of a light source apparatus of Example 6. As shown in FIG. 17, this apparatus comprises (a) an optical pulse generator 100 for generating pulse light having a predetermined wavelength, (b) an optical amplifier 200 for receiving pulse light output from the optical pulse generator 100, amplifying the pulse light, and outputting high peak pulse light, and (c) an optical fiber 321 for receiving the high peak pulse light output from the optical amplifier 200, generating SC light by propagating the input light therethrough, and outputting the SC light.

The optical fiber 321 comprises a dispersion-flattened fiber having the foll characteristics:

$D_{IN}$=1.8 (ps/nm/km)

$D_{out}$=−0.1 (ps/nm/km)

$D_{slop}$=0.01 (ps/nm$^2$/km)

L=3 (km)

$n_g$=2.0×10$^{-31\ 20}$ (m$^2$/W)

Aeff=50 ($\mu$m$^2$)

Figure 18:
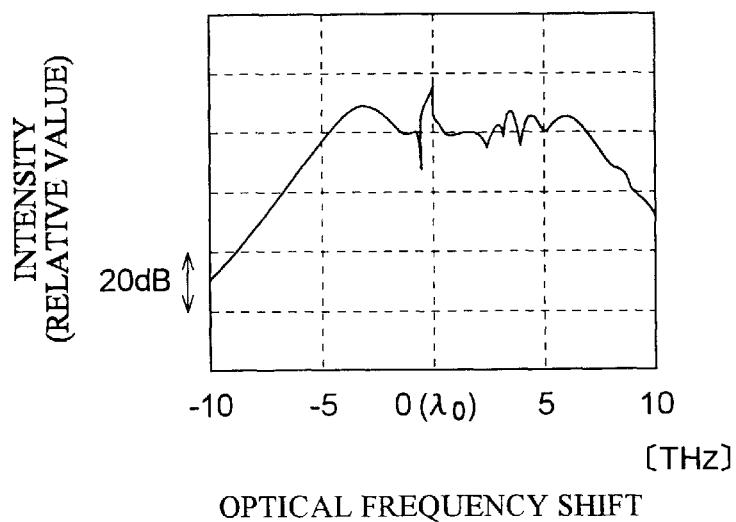
FIG. 18 is a graph showing the spectra of SC light generated by the light source apparatus of Example 6.

FIG. 18 is a graph showing the measurement result of generation of SC light in Example 6. The high peak pulse light input to the optical fiber 321 was identical to that of Example 1.

As shown in FIG. 10, the light source apparatus of Example 2 generated and output SC light in which the displacement width wf of the optical frequency of the flat peak portion in the output spectra near the wavelength=1, 550 ($\mu$m) was about 12,000 (GHz). That is, the light source apparatus of Example 6 output SC light having a wavelength width of about 96 nm.

Third Embodiment

Figure 19:
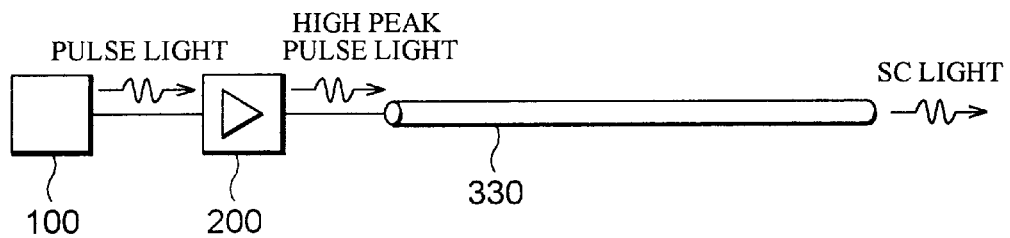
FIG. 19 is a view showing the structure of a light source apparatus according to the third embodiment.

FIG. 19 is a view showing the structure of a light source apparatus according to the third embodiment of the present invention. As shown in FIG. 19, this apparatus comprises (a) an optical pulse generator 100 for generating pulse light having a predetermined wavelength, (b) an optical amplifier 200 for receiving pulse light output from the optical pulse generator 100, amplifying the pulse light, and outputting high peak pulse light, and (c) an optical fiber 330 for receiving the high peak pulse light output from the optical amplifier 200, generating SC light by propagating the input light therethrough, and outputting the SC light.

Figure 20:
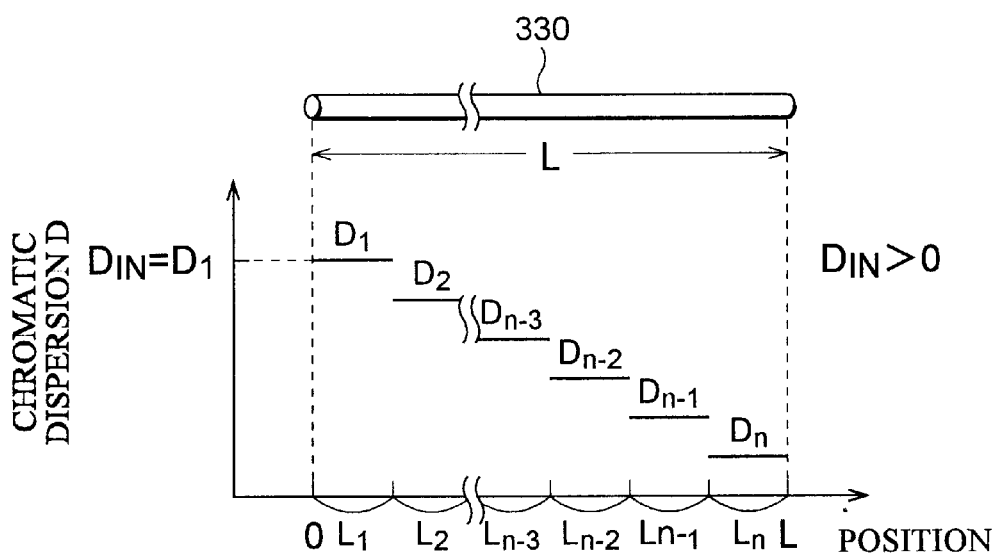
FIG. 20 is a view showing the structure of an optical fiber 320 used in the third embodiment.

FIG. 20 is a graph showing the chromatic dispersion distribution in the longitudinal direction (light propagation direction) of the optical fiber 330.

The third embodiment is the same as the first embodiment in that the chromatic dispersion $D_{IN}$ of the high peak pulse light from the optical amplifier 200 at the incident and has a positive value, as shown in FIG. 20, but the second embodiment is different from the first embodiment in that the chromatic dispersion D discretely decreases along the longitudinal direction.

This optical fiber can be obtained by connecting optical fibers each as a section having a chromatic dispersion value D1 and a length L.

As in the first embodiment, in the light source apparatus of the third embodiment, the short pulse light generated by the optical pulse generator 100 is input to the optical amplifier 200, amplified, and output as high peak pulse light. The high peak pulse light output from the optical amplifier 200 is input to the optical fiber 330.

As in the first embodiment, when the high peak pulse light is input to the optical fiber 330, the refractive index for the light is changed by the optical Kerr effect, thereby causing self-phase modulation.

As a result, a wavelength distribution of the light is formed in the light pulse in the optical fiber 330. The light input to the optical fiber 330 propagates in an anomalous dispersion region in which the chromatic dispersion has a positive value. In the anomalous dispersion region in which the group velocity is lower at longer wavelengths, pulse compression progresses. When the dispersion decreases in the longitudinal direction, the pulse is compulsorily compressed and the peak power increases, thereby promoting the nonlinear optical effect to cause the spectra broaden.

The compressed optical pulses contain light components having wavelengths within a given wavelength range. During the dispersion value is varying from a positive-value to a negative-value, the light is much effected by the four wave mixing by the optical Kerr effect to generate light having wider wavelength range, thereby generating SC light.

In this embodiment, it is preferable that the absolute value of the dispersion slope of an optical fiber be small as in the first embodiment. When the absolute value of an integral value associated with the dispersion slope in the longitudinal direction decreases, overlapping of light components having different wavelengths increases as a function of time, thereby easily mixing four light waves as in the first embodiment.

As in the first embodiment, the Kerr effect that is a nonlinear optical effect which causes self-phase modulation and four wave mixing tends to exhibit itself more easily as the nonlinear refractive index and the light intensity density increase. To obtain a wavelength width of several 10 nm or more, if $n_2$, Aeff and Ppeak respectively represent the nonlinear refractive index, the effective sectional area of a core, and the peak power of high peak pulse light, the following relation must hold:

$$(n_2/Aeff) \cdot Ppeak > 0.03 \times 10^{-8} \ (1/W) \times 1.5 \ (W) = 0.045 \times 10^{-8} \quad (1)$$

In this embodiment, the optical fiber 330 preferably has polarization-maintaining characteristics, and is comprised of a polarization-maintaining optical fiber as in the first embodiment. In mixing of four light waves, when two interacting light components have the same polarization direction, the four waves can be mixed best.

The light source apparatus of this embodiment will be described in detail by way of its example.

EXAMPLE 7

Figure 21:
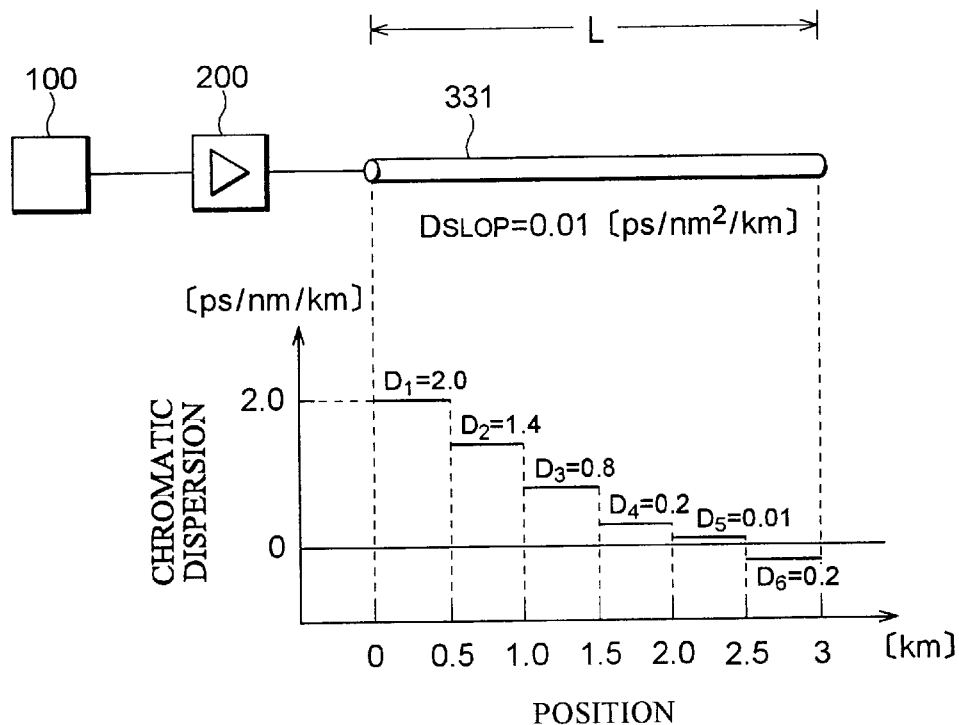
FIG. 21 is a view showing the structure of a light source apparatus of Example 7.

FIG. 21 is a view showing the structure of a light source apparatus of Example 7. As shown in FIG. 21, this apparatus comprises (a) an optical pulse generator 100 for generating pulse light having a predetermined wavelength, (b) an optical amplifier 200 for receiving pulse light output from the optical pulse generator 100, amplifying the pulse light, and outputting high peak pulse light, and (c) an optical fiber 331 for receiving the high peak pulse light output from the optical amplifier 200, generating SC light by propagating the input light therethrough, and outputting the SC light.

As shown in FIG. 21, the optical fiber 331 has the length Li of each section to be 500 (m) and the following characteristics:

D1=2.0 (ps/nm/km)
D2=1.4 (ps/nm/km)
D3=0.8 (ps/nm/km)
D4=0.2 (ps/nm/km)
D5=0.01 (ps/nm/km)
D6=−0.2 (ps/nm/km)
$D_{slop}$=0.01 (ps/nm²/km)
L=(km)
$n_2$=2.0×10$^{-20}$ (m²/W)
Aeff=50 ($\mu$m²)

Figure 22:
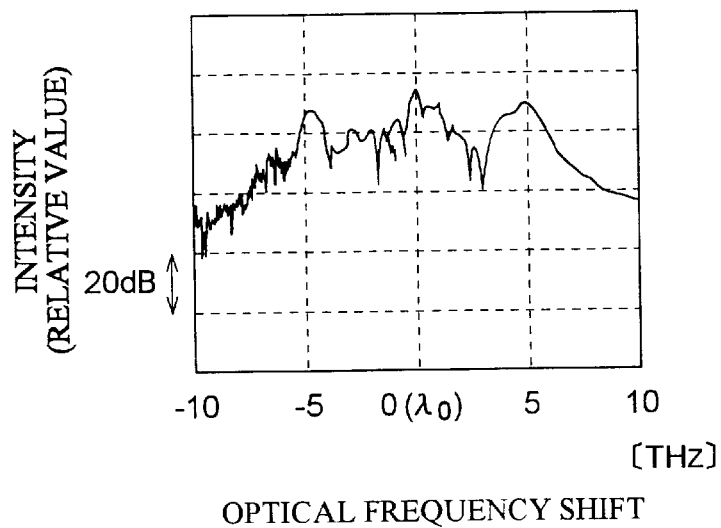
FIG. 22 is a graph showing the spectra of SC light generated by the light source apparatus of Example 7.

FIG. 22 is a graph showing spectra of SC light output from the optical fiber 312. The high peak pulse light input to the optical fiber 331 was identical to that of Example 1.

As shown in FIG. 22, the light source apparatus of Example 7 generated and output SC light in which the displacement width wf of the optical frequency of the flat peak portion in the output spectra near the wavelength=1, 550 ($\mu$m) was about 12,000 (GHz). That is, the light source apparatus of Example 7 output SC light having a wavelength width of about 96 nm.

Fourth Embodiment

Figure 23:
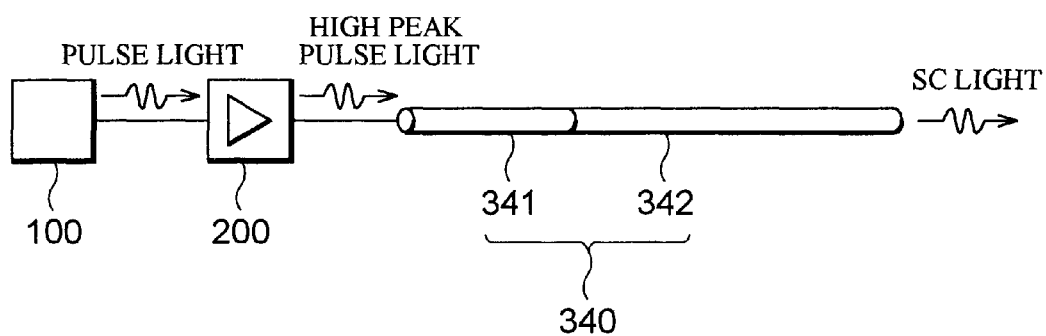
FIG. 23 is a view showing the structure of a light source apparatus according to the fourth embodiment.

FIG. 23 is a view showing the structure of a light source apparatus according to the fourth embodiment of the present invention. As shown in FIG. 23, this apparatus comprises (a) an optical pulse generator 100 for generating pulse light having a predetermined wavelength, (b) an optical amplifier 200 for receiving pulse light output from the optical pulse generator 100, amplifying the pulse light, and outputting high peak pulse light, and (c) an optical fiber 340 having optical fibers 341 and 342 to receive the high peak pulse light output from the optical amplifier 200, generate SC light by propagating the input light therethrough, and output the SC light.

Figure 24:
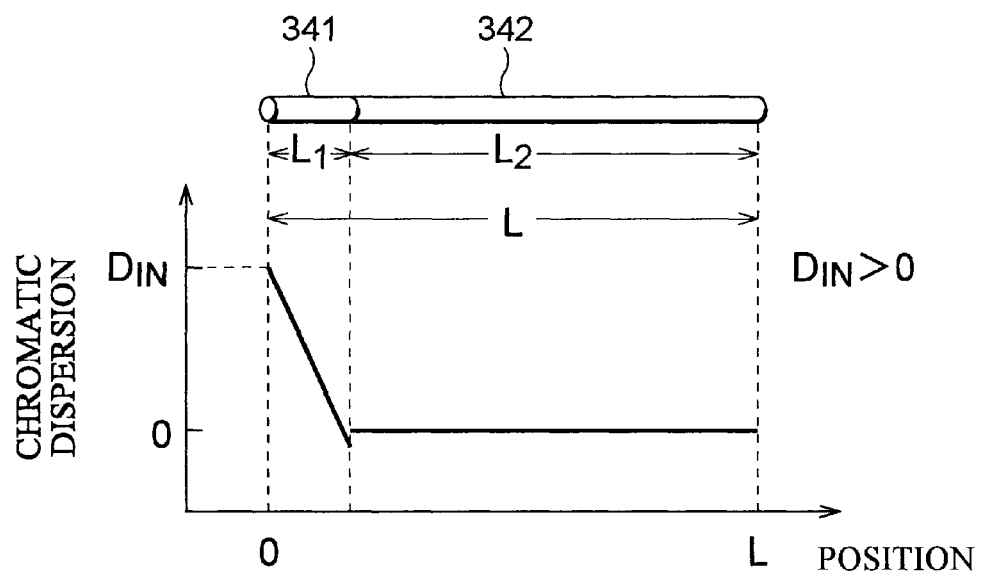
FIG. 24 is a view showing the structure of an optical fiber 320 used in the fourth embodiment.

FIG. 24 is a graph showing the chromatic dispersion distribution of the optical fiber 340 in the longitudinal direction (light propagation direction). As shown in FIG. 24, (i) in the optical fiber 341, a chromatic dispersion $D_{IN}$ of the high peak pulse light from the optical amplifier 200 at the incident end has a positive value, and a chromatic dispersion D linearly decreases along the longitudinal direction, and (ii) in the optical fiber 342, the chromatic dispersion has a small value.

This optical fiber can be obtained by connecting optical fibers each as a section having a chromatic dispersion value Di and a length T.

As in the first embodiment, in the light source apparatus of the third embodiment, the short pulse light generated by the optical pulse generator 100 is input to the optical amplifier 200, amplified, and output as high peak pulse light. The high peak pulse light output from the optical amplifier 200 is input to the optical fiber 341 of the optical fiber 340.

As in the first embodiment, when the high peak pulse light is input to the optical fiber 341, the refractive index for the light is changed by the optical Kerr effect, thereby causing self-phase modulation. As a result, a wavelength distribution of the light is formed in the light pulse in the optical fiber 341. The light input to the optical fiber 341 propagates in an anomalous dispersion region in which the chromatic dispersion has a positive value. In the anomalous dispersion region in which the group velocity is lower at longer wavelengths, pulse compression progresses. When the dispersion decreases in the longitudinal direction, the pulse is compulsorily compressed and the peak power increases, thereby promoting the nonlinear optical effect to cause the spectra broaden.

The compressed optical pulses contain light components having wavelengths within a given wavelength range. During the dispersion value is varying from a positive-value to a negative-value, the light is much effected by the four wave mixing by the optical Kerr effect to generate light having wider wavelength range, thereby generating SC light.

The SC light thus generated is output from the optical fiber 341 and input to the optical fiber 342. The light propagates through the optical fiber 342 and then output.

In this embodiment, it is preferable that the absolute value of the dispersion slope of the optical fiber 341 be small as in the first embodiment. When the absolute value of an integral value associated with the dispersion slope in the longitudinal direction decreases, overlapping of light components having different wavelengths increases as a function of time, thereby easily mixing four light waves as in the first embodiment.

As in the first embodiment, the Kerr effect that is a nonlinear optical effect which causes self-phase modulation and four wave mixing in the optical fiber 341 tends to exhibit it self more easily as the nonlinear refractive index and the light intensity density increase. To obtain a wavelength width of several 10 nm or more, if $n_2$, Aeff and Ppeak respectively represent the nonlinear refractive index, the effective sectional area of a core, and the peak power of high peak pulse light, the following relation must hold:

$$(n_2/Aeff) \cdot Ppeak > 0.03 \times 10^{-31 \, 8} \, (1/W) \times 1.5 \, (W) = 0.045 \times 10^{-31 \, 8} \quad (1)$$

In this embodiment, the optical fiber 341 preferably has polarization-maintaining characteristics, and is comprised of a polarization-maintaining optical fiber as in the first embodiment. In mixing of four light waves, when two interacting light components have the same polarization direction, the four waves can be mixed best.

The light source apparatus of this embodiment will be described in detail by way of its example.

EXAMPLE 8

Figure 25:
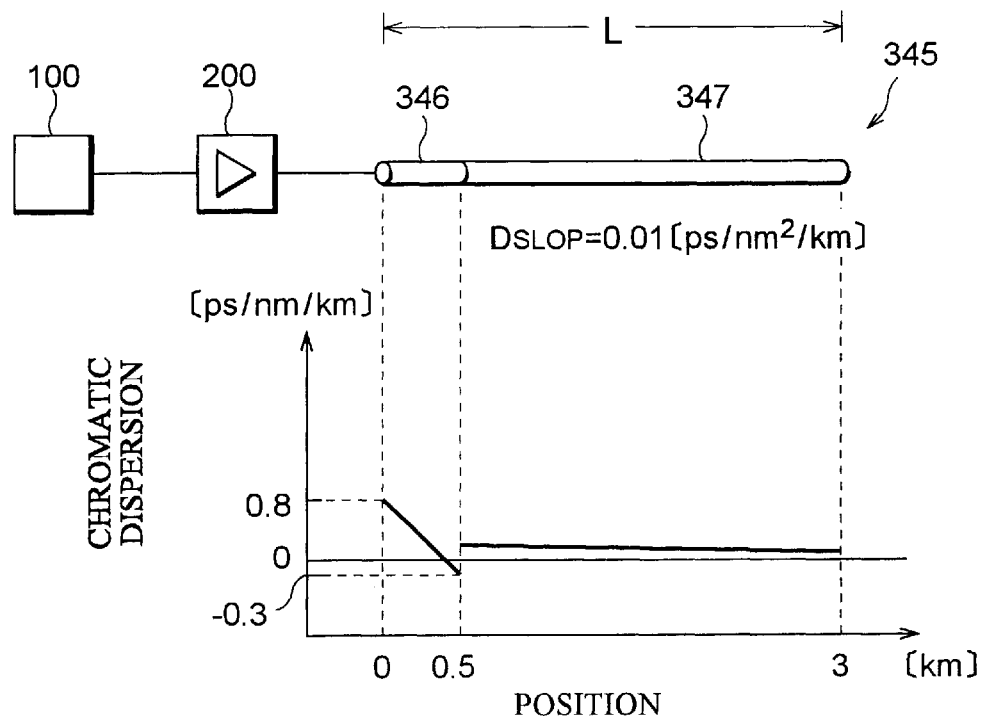
FIG. 25 is a view showing the structure of a light source apparatus of Example 8.

FIG. 25 is a view showing the structure of a light source apparatus of Example 8. As shown in FIG. 25, this apparatus comprises (a) an optical pulse generator 100 for generating pulse light having a predetermined wavelength, (b) an optical amplifier 200 for receiving pulse light output from the optical pulse generator 100, amplifying the pulse light, and outputting high peak pulse light, and (c) an optical fiber 345 having optical fibers 346 and 347 to receive the high peak pulse light output from the optical amplifier 200, generate SC light by propagating the input light therethrough, and output the SC light.

As shown in FIG. 25, the optical fiber 346 has the following characteristics:

$D_{IN}$=0.8 (ps/nm/km)
$\Delta D$=~0 (ps/nm/km$^2$)
$D_{slop}$=0.01 (ps/nm$^2$/km)
L=0.5 (km)
$n_2$=6.0×10$^{-20}$ (n$^2$/W)
Aeff=10 ($\mu$m$^2$)

As shown in FIG. 25, the optical fiber 347 has the following characteristics:

$D_{IN}$=~0 (ps/nm/km)
$\Delta D$=~0 (ps/nm/km$^2$)
$D_{slop}$=0.01 (ps/nm$^2$/km)
L=2.5 (km)
$n_2$=6.0×10$^{-20}$ (m$^2$/W)
Aeff=10 ($\mu$m$^2$)

Figure 26:
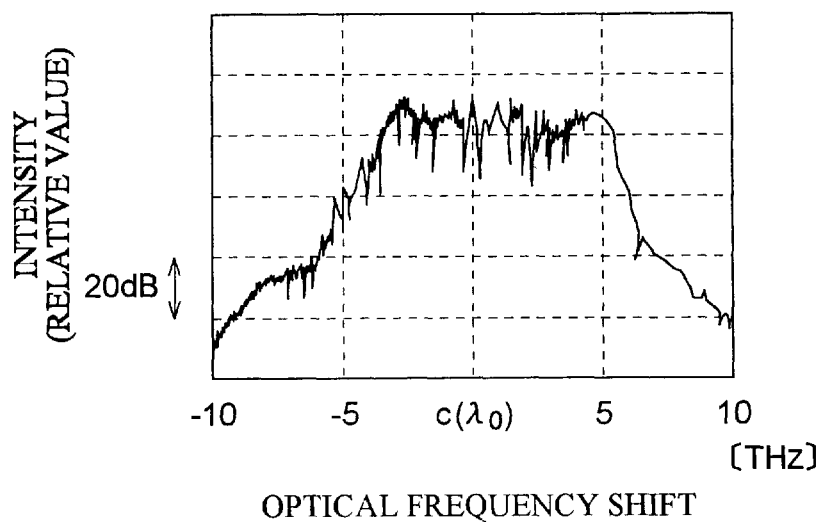
FIG. 26 is a graph showing the spectra of SC light generated by the light source apparatus of Example 8.

FIG. 26 is a graph showing the spectra of SC light output from the optical fiber 345. The high peak pulse light input to the optical fiber 345 was identical to that of Example 1.

As shown in FIG. 26, the light source apparatus of Example 8 generated and output SC light in which the displacement width wf of the optical frequency of the flat peak portion in the output spectra near the wavelength=1, 550 ($\mu$m) was about 10,000 (GHz). That is, the light source apparatus of Example 8 output SC light having a wavelength width of about 80 nm.

Note that the fourth embodiment can be modified as in the second or third embodiment for the first embodiment.

Fifth Embodiment

Figure 27:
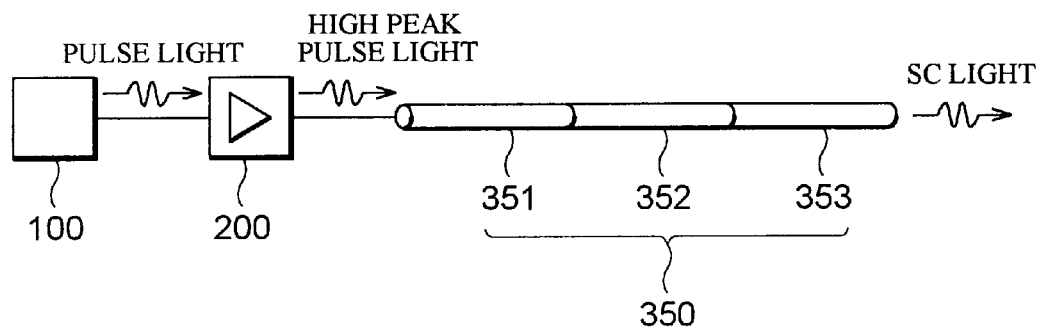
FIG. 27 is a view showing the structure of a light source apparatus according to the fifth embodiment.

FIG. 27 is a view showing the structure of a light source apparatus according to the fifth embodiment of the present invention. As shown in FIG. 27, this apparatus comprises (a) an optical pulse generator 100 for generating pulse light having a predetermined wavelength, (b) an optical amplifier 200 for receiving pulse light output from the optical pulse generator 100, amplifying the pulse light, and outputting high peak pulse light, and (c) an optical fiber 350 having optical fibers 351, 352, and 353 to receive the high peak pulse light output from the optical amplifier 200, generate SC light by propagating the input light therethrough, and output the SC light.

Figure 28:
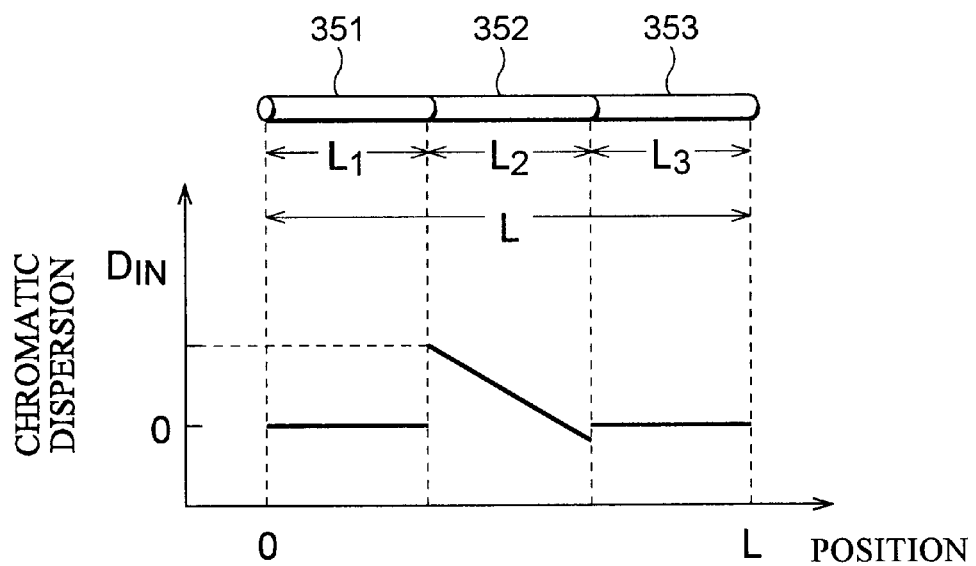
FIG. 28 is a view showing the structure of an optical fiber 320 used in the fifth embodiment.

FIG. 28 is a graph showing the chromatic dispersion distribution of the optical fiber 350 in the longitudinal direction (light propagation direction). As shown in FIG. 28, (i) in the optical fiber 351, the chromatic dispersion D has a small value, (ii) in the optical fiber 352, the chromatic dispersion $D_{IN}$ of the high peak pulse light from the optical amplifier 200 at the incident end has a positive value, and the chromatic dispersion D linearly decreases along the longitudinal direction, and (iii) in the optical fiber 353, the chromatic dispersion D has a small value.

This optical fiber can be obtained by connecting optical fibers each as a section having a chromatic dispersion value Di and a length L.

As in the first embodiment, in the light source apparatus of the third embodiment, the short pulse light generated by the optical pulse generator 100 is input to the optical amplifier 200, amplified, and output as high peak pulse light. The high peak pulse light output from the optical amplifier 200 is input to the optical fiber 351 of the optical fiber 350. The light from the optical fiber 351 is input to the optical fiber 352.

As in the first embodiment, when the high peak pulse light is input to the optical fiber 352, the refractive index for the light is changed by the optical Kerr effect, thereby causing self-phase modulation. As a result, a wavelength distribution of the light is formed in the pulse light in the optical fiber 352. The light input to the optical fiber 352 propagation in an anomalous dispersion region in which the chromatic dispersion has a positive value. In the anomalous dispersion region in which the group velocity is lower at longer wavelengths, pulse compression progresses. When the dispersion decreases in the longitudinal direction, the pulse is compulsorily compressed and the peak power increases, thereby promoting the nonlinear optical effect to cause the spectra broaden.

The compressed optical pulses contain light components having wavelengths within a given wavelength range. During the dispersion value is varying from a positive-value to a negative-value, the light is much effected by the four wave mixing by the optical Kerr effect to generate light having wider wavelength range, thereby generating SC light.

The SC light thus generated is output from the optical fiber 352 and input to the optical fiber 353. The light propagates through the optical fiber 353 and then output.

In this embodiment, it is preferable that the absolute value of the dispersion slope of the optical fiber 352 be small as in the first embodiment. When the absolute value of an integral value associated with the dispersion slope in the longitudinal direction is almost zero, overlapping of light components having different wavelengths increases as a function of time, thereby easily mixing four light waves as in the first embodiment.

As in the first embodiment, the Kerr effect that is as nonlinear optical effect which causes self-phase modulation and four wave mixing in the optical fiber 352 tends to exhibit itself as the nonlinear refractive index and the light intensity density increase. To obtain a wavelength width of several 10 nm or more, if $n_2$, Aeff and Ppeak respectively represent the nonlinear refractive index, the effective section area of a core, and the peak power of high peak pulse light, the following relation must hold:

$$(n_2/Aeff) \cdot Ppeak > 0.03 \times 10^{-8}(1/w) \times 1.5(W) = 0.045 \times 10^{-8} \ldots \quad (1)$$

In this embodiment, the optical fibers 351 and 352 preferably have polarization-maintaining characteristics, and is comprised of a polarization-maintaining optical fiber as in the first embodiment. In mixing of four light waves, when two interacting light components have the same polarization direction, the four waves can be mixed best.

This embodiment will be described below by way of its example.

EXAMPLE 9

Figure 29:
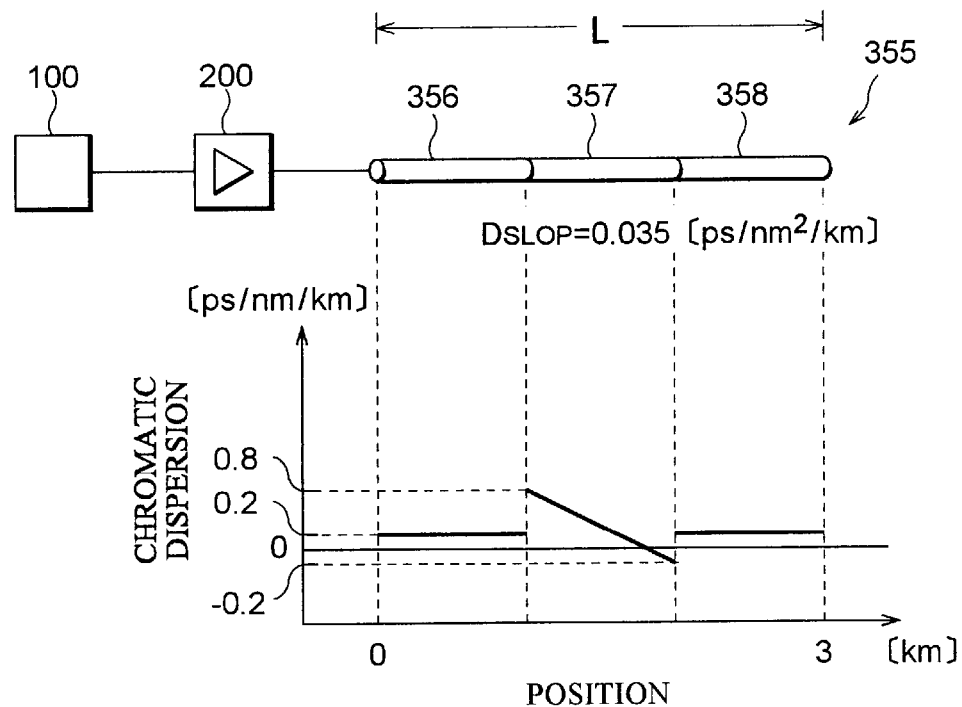
FIG. 29 is a view showing the structure of a light source apparatus of Example 9.

FIG. 29 is a view showing the structure of a light source apparatus of Example 9. As shown in FIG. 29, this apparatus comprises (a) an optical pulse generator 100 for generating pulse light having a predetermined wavelength, (b) an optical amplifier 200 for receiving pulse light output from the optical pulse generator 100, amplifying the pulse light, and outputting high peak pulse light, and (c) an optical fiber 355 having optical fibers 356, 357, and 358 to receive the high peak pulse light output from the optical amplifier 200, generate SC light by propagating the input light therethrough, and output the SC light.

As shown in FIG. 29, the optical fiber 356 has the following characteristics:

$D_{IW}$=0.2 (ps/nm/km)

$\Delta D$=~0 (ps/nm/km$^2$)

$D_{SLOP}$=0.035 (ps/nm$^2$/km)

L=1 (km)

$n_2$=5.0×10$^{-20}$ (m$^2$/W)

Aeff=13.85 ($\mu$m$^2$)

As shown in FIG. 29, the optical fiber 357 has the following characteristics:

$D_{IN}$=0.8 (ps/nm/km)

$\Delta D$=~0 (ps/nm/km$^2$)

$D_{SLOP}$=0.035 (ps/nm$^2$/km)

L=1 (km)

$n_2$=5.0×10$^{-20}$ (m$^2$/W)

Aeff=13.85 ($\mu$m$^2$)

As shown in FIG. 29, the optical fiber 358 has the following characteristics:

$D_{IN}$=0.2 (ps/nm/km)

$\Delta D$=~0 (ps/nm/km$^2$)

$D_{SLOP}$=0.035 (ps/nm$^2$/km)

L=1 (km)

$n_2$=5.0×10$^{-20}$ (m$^2$/W)

Aeff=13.85 ($\mu$m$^2$)

Figure 30:
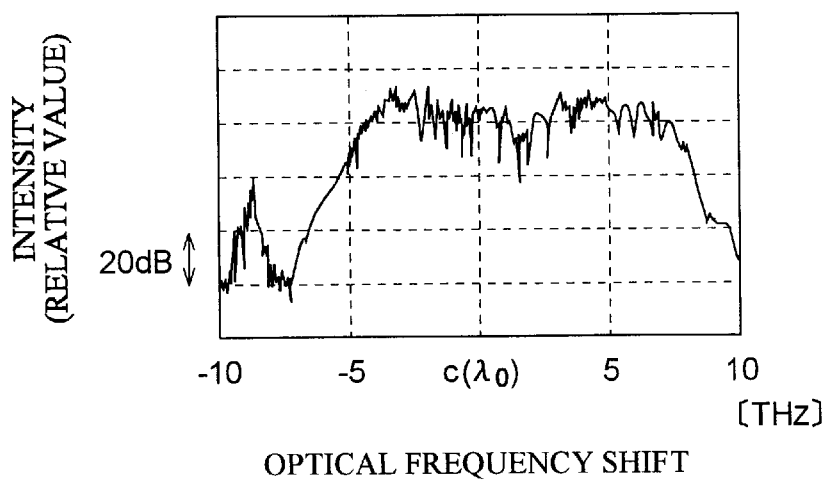
FIG. 30 is a graph showing the spectra of SC light generated by the light source apparatus of Example 9.

FIG. 30 is a graph showing the spectra of SC light output from the optical fiber 355. The high peak pulse light input to the optical fiber 355 was identical to that of Example 1.

As shown in FIG. 30, the light source apparatus of Example 9 generated and output SC light in which the displacement width wf of the optical frequency of the flat peak portion in the output spectra near the wavelength=1550 ($\mu$m) was about 12,000 (GHz). That is, the light source apparatus of Example 9 output SC light having a wavelength width of about 96 nm.

Note that the fifth embodiment can be modified as in the second or third embodiment for the first embodiment.

Figure 31:
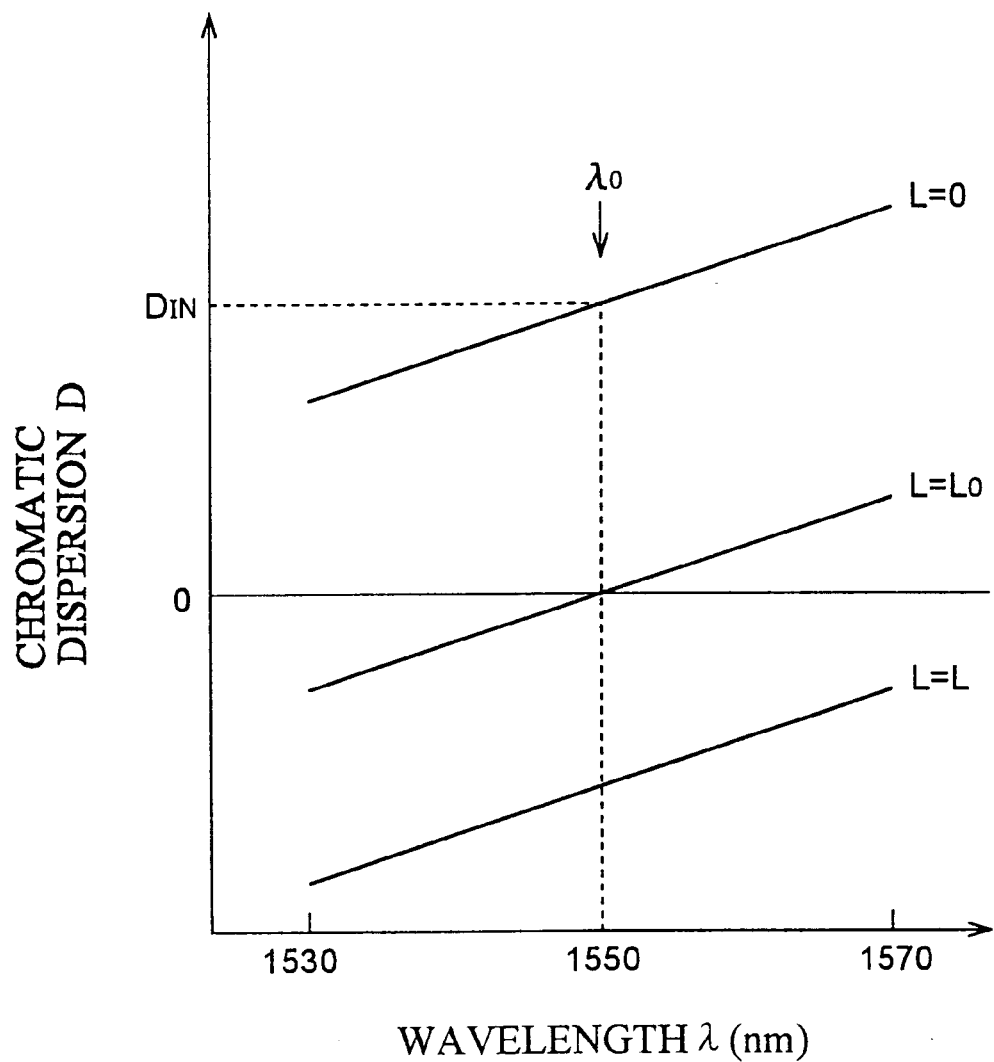
FIG. 31 is a graph showing the relation between the wavelength λ (nm) and the chromatic dispersion D.

The zero-dispersion wavelength at a predetermined position (L=L) of the optical fiber for SC light corresponds to the wavelength $\lambda_C$ of the incident pulse light as shown in FIG. 31. Assume that the chromatic dispersion is $D_{IN}$ at the incident end (L=0) of the optical fiber $\lambda_0$, and that the optical fiber has a constant chromatic dispersion slope $D_{SLOP}$ at any position within a wavelength range of $\lambda_C \pm 20$.

Sixth Embodiment

Figure 32:
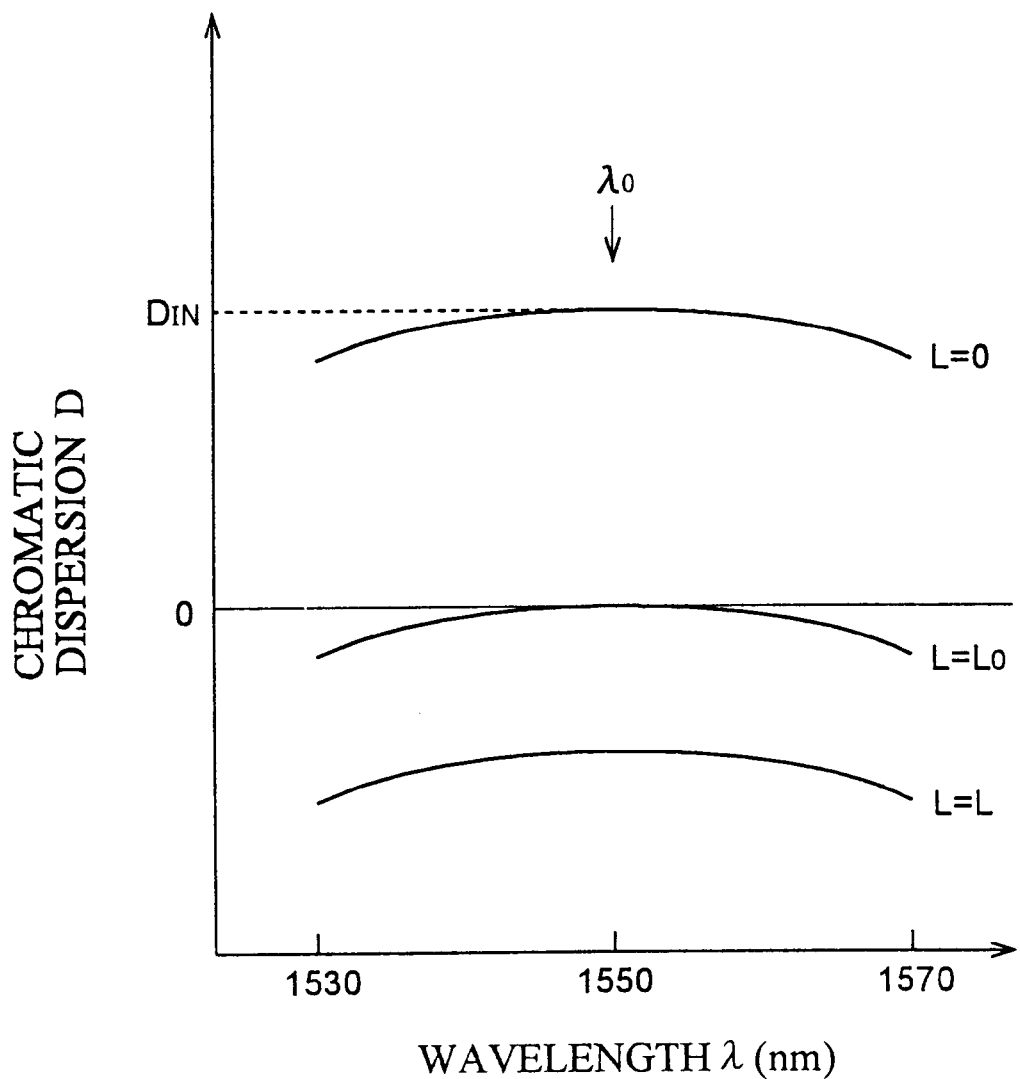
FIG. 32 is a graph showing the relation between the wavelength λ (nm) and the chromatic dispersion D.

It is not necessary for generating a SC light, that the dispersion slope $D_{SLOP}$ be constant within the wavelength range of $\lambda_0 \pm 20$, and the slope $D_{SLOP}$ may be flat ($D_{SLOP}$=0) in this range as shown in FIG. 32. This fiber has two zero-dispersion wavelengths in the wavelength range of 1530–1570 nm at a predetermined longitudinal position.

Figure 33:
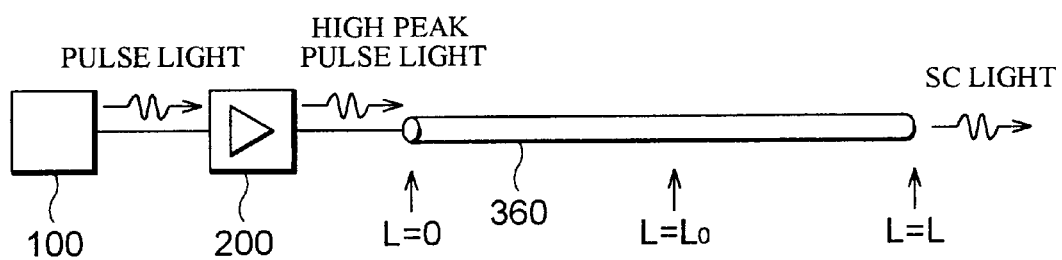
FIG. 33 is a view showing the structure of a light source apparatus according to the sixth embodiment.

FIG. 33 shows a light source apparatus according to the sixth embodiment. This apparatus uses the optical fiber 360 for generating SC light, this optical fiber 360 having the characteristics shown in FIG. 32. As shown in FIG. 33, this apparatus comprises (a) the optical pulse generator 100 for generating a pulse light with a predetermined wavelength, (b) the optical amplifier for emitting a high-peak pulse light by amplifying the input pulse light received from the optical pulse generator 100, and (c) an optical fiber 360 for emitting SC light by generating the SC light by transmitting the high-peak pulse light emitted by the optical amplifier 200. The optical fiber 360 has a positive-value chromatic dispersion $D_{IN}$ at the end at which the high-peak pulse light from the optical amplifier 200 is incident, and the chromatic dispersion D within a predetermined wavelength range of $\lambda_0 \pm 20$ nm which decreases linearly along the longitudinal direction of the fiber. That is, a chromatic dispersion D at length L=0 is $D_{IN}$, and a chromatic dispersion D at length L=$L_0$ is zero, and a chromatic dispersion D at length L=L is $D_{OUT}$.

In the light source apparatus in this embodiment, the optical pulse generator 100 generates short pulse light having a predetermined wavelength. The short pulse light output from the optical pulse generator 100 is transmitted to the optical amplifier 200, and is amplified and emitted as high peak pulse light. The high peak pulse light emitted from the optical amplifier 200 is transmitted to the optical fiber 360.

When the high peak pulse light enters the optical fiber 360, the refractive index for the light is changed by the optical Kerr effect to cause self-phase modulation of the light wave. As a result, a light wavelength distribution is formed in the light pulse in optical fiber 360. The light input to optical fiber 360 propagates in an anomalous dispersion region in which the chromatic dispersion has a positive value. In the anomalous dispersion region where the group velocity is lower at longer wavelengths, pulse compression occurs. When the dispersion decreases in the longitudinal direction, the pulse is compulsorily compressed and the peak power increases, thereby promoting the nonlinear optical effect to cause the spectra broaden.

The compressed optical pulses contain light components having wavelengths within a given wavelength range. During the dispersion value is varying from a positive-value to a negative-value, the light is much effected by the four wave mixing by the optical Kerr effect to generate light having wider wavelength range, thereby generating SC light.

Figure 34:
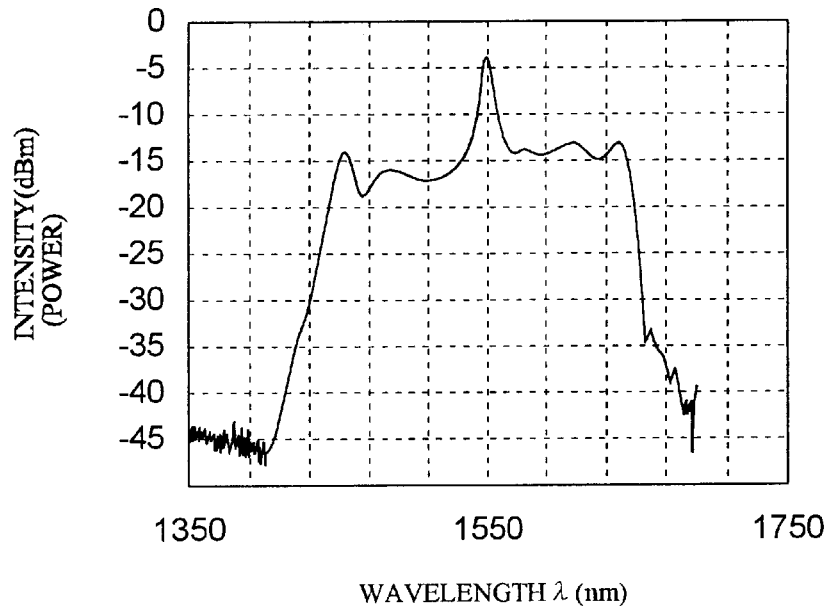
FIG. 34 is a graph showing the relation between the wavelength λ (nm) and the optical intensity (dBm)

FIG. 34 is a graph showing the spectra of the light emitted from SC light fiber 360. The length of optical fiber 360 is 1 km. The wavelength $\lambda_C$ at the peak of this spectra is 1550 nm, and the SC band is defined as the width of that portions of the emitted light spectra that has an intensity level greater than the maximum intensity level minus 20 dB. The SC band is not less than 100 nm. The flatness of the emitting spectra within the wavelength range of the peak wavelength $\lambda_0 \pm 50$ nm is 15 dB or less, i.e., the difference between the maximum and minimum of the emitting light intensity within this range is 15 dB or less.

Figure 35:
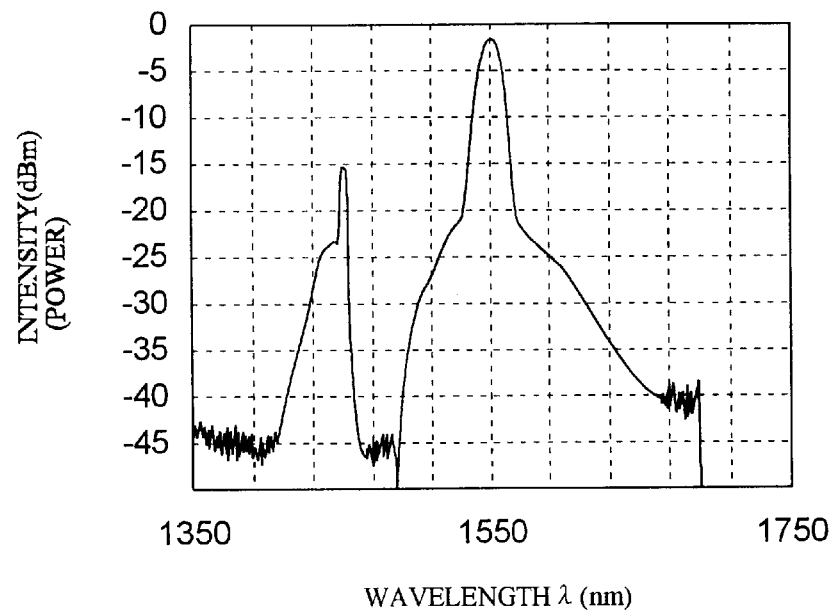
FIG. 35 is a graph showing the relation between the wavelength λ (nm) and the optical intensity (dBm)

FIG. 35 shows a spectra obtained when the same optical pulse travels through optical fiber 360 in the reverse direction. In this case, the width of the emitted light spectra is only slightly increased and the SC band is 30 nm or less. The flatness of the emitting light spectra, i.e., the difference between the maximum and minimum of the emitting light intensity is greater than 15 dB. Note that the left most peak is the noise light spectra.

Figure 36:
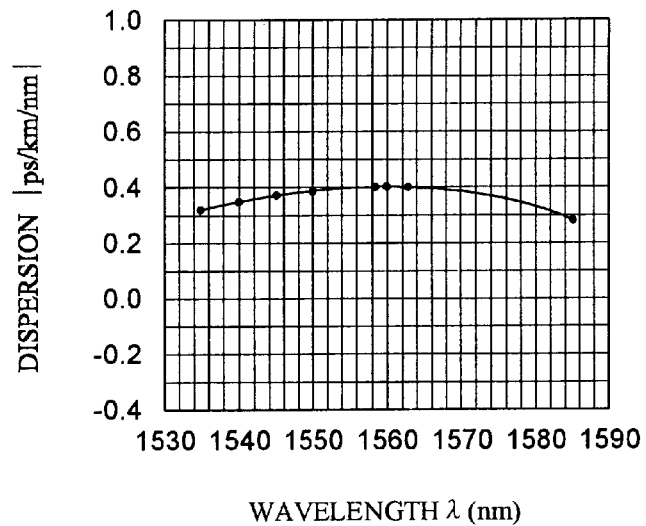
FIG. 36 is a graph showing the relation between the wavelength λ (nm) and the chromatic dispersion (ps/km/nm)
Figure 37:
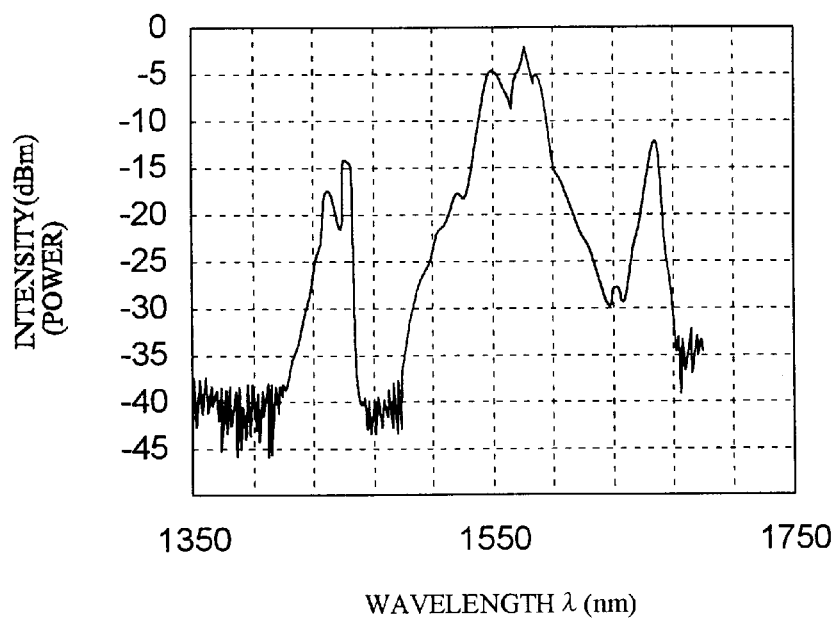
FIG. 37 is a graph showing the relation between the wavelength λ (nm) and the optical intensity (dBm)

FIG. 37 shows a spectra obtained by passing the optical pulse used in FIG. 34 through an optical fiber having a constant chromatic dispersion D along the longitudinal direction and having the chromatic dispersion distribution characteristic shown in FIG. 36. The length of this optical fiber is 1 km, and the flatness of this spectra is greater than 15 dB. Note that the left most peak is the noise light spectra.

Figure 38:
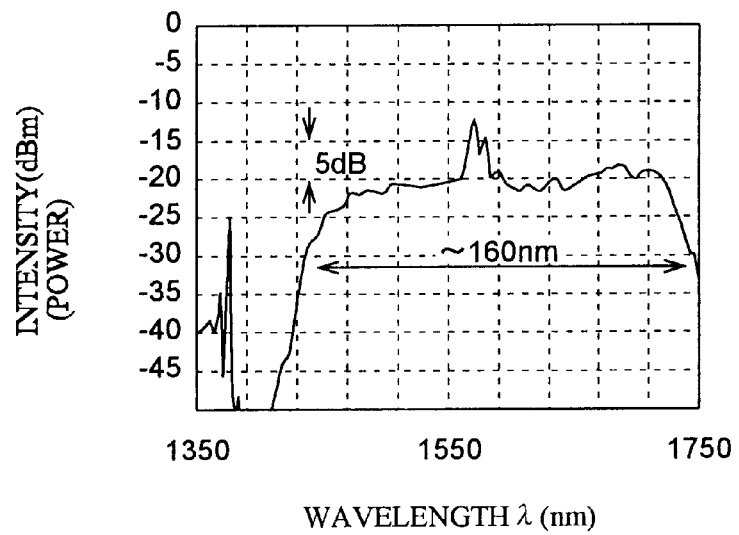
FIG. 38 is a graph showing the relation between the wavelength λ (nm) and the optical intensity (dBm)

Next, SC light will be explained. FIG. 38 shows a spectra of emitted light from optical fiber 310 shown in FIG. 1, the fiber having the chromatic dispersion characteristics of FIG. 31 and having a chromatic dispersion D that decreases linearly along the length direction L thereof. The dispersion slope $D_{SLOP}$ of this fiber is 0.03 (ps/nm²/km), and the dispersion D decreases from 3 to −2 (ps/nm/km). The full-width at half maximum of this spectra is 160 nm, and the flatness of the emitting light spectra is 160 nm, and the flatness of the emitting light spectra within the wavelength range of the peak wavelength $\lambda_0 \pm 50$ nm is 15 dB or less, i.e., the difference between the maximum and minimum of the emitting light intensity within this range is 15 dB or less.

Therefore, the SC light is defined as light having the flatness of the spectra of the emitted light within the wavelength range of the peak wavelength $\lambda_0 \pm 50$ nm that is 15 dB or less, and the full-width at half maximum of the spectra is at least 30 nm and preferably 100 nm or more.

Figure 39:
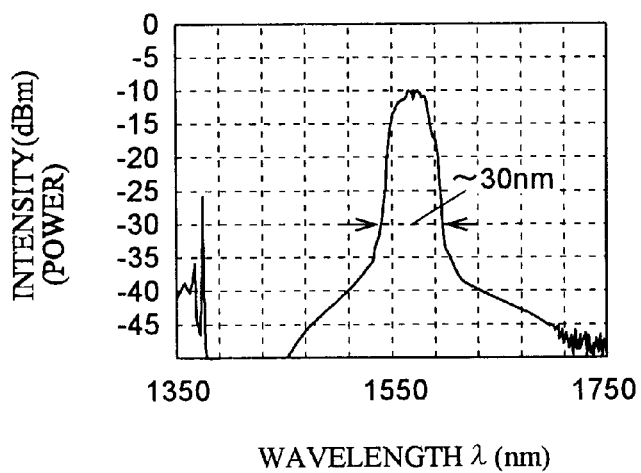
FIG. 39 is a graph showing the relation between the wavelength λ (nm) and the optical intensity (dBm)

FIG. 39 shows a spectra obtained by passing the same optical pulse through optical fiber 310 in the reverse direction. This is not SC light and the flatness of the spectra of the emitting light within the wavelength range of the peak wavelength $\lambda_0 \pm 50$ nm is greater than 15 dB, and the full width at half maximum of the spectra is smaller than 30 nm.

Figure 40:
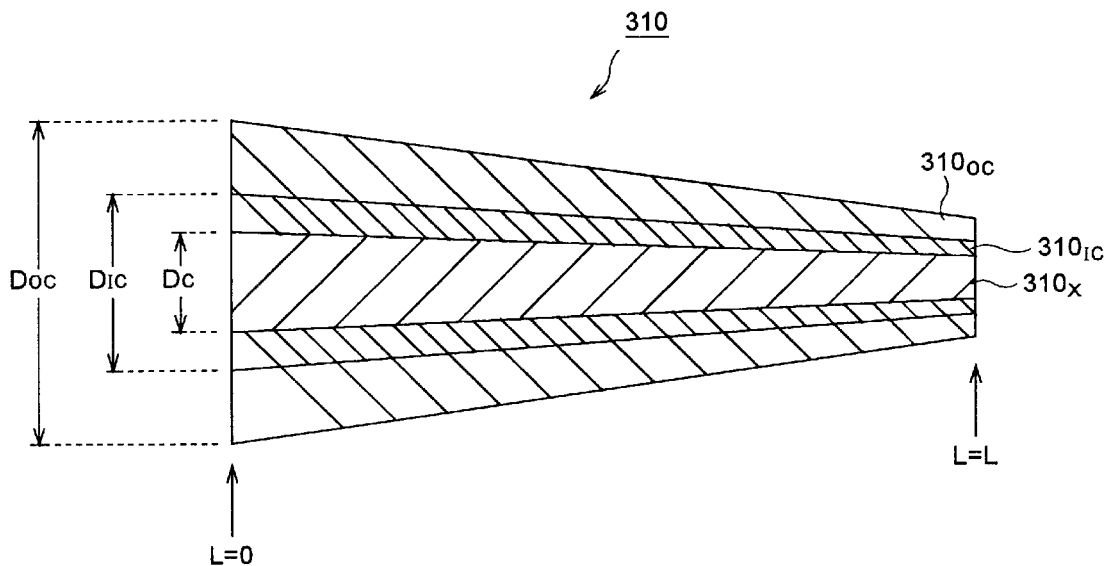
FIG. 40 is a cross sectional view showing the optical fiber.

FIG. 40 is a cross sectional view of this optical fiber 310. This optical fiber 310 comprises a core 310x, an inner cladding 310$_{IC}$ surrounding the core 310x, and an outer cladding 310$_{OC}$ surrounding the inner cladding 310$_{IC}$. The diameter Dc of the core decreases linearly in the length direction (the light propagating direction). The diameter $D_{IC}$ of the inner cladding decreases linearly in the length direction. The diameter $D_{OC}$ of the outer cladding decreases linearly in the length direction. The amount of variation in the diameter $D_{OC}$ with respect to the length ($D_{OC}$/Km) is preferably 2 μm/km or more in order to cause nonlinear optical effect such as SC light generation. Further, the variation ((Dc/Doc)/km) in the ratio (Dc/Doc) of the diameter, Dc, of the core 310 to the outer diameter, Doc, of the optical fiber 310 per kilometer is preferably 0.5%/km or more.

Figure 41:
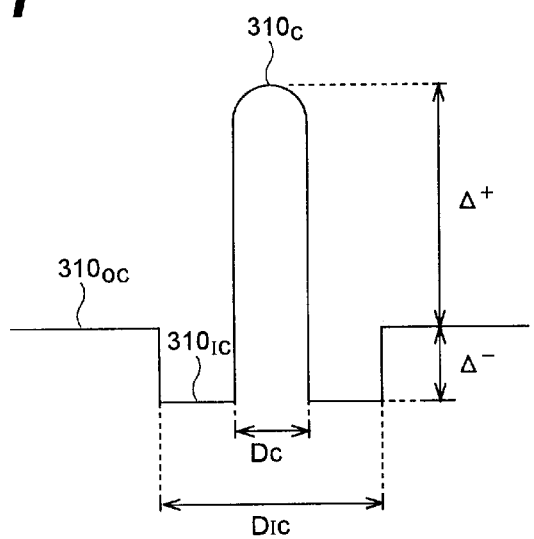
FIG. 41 shows a index distribution along the diameter of the optical fiber.

FIG. 41 shows a refractive index distribution in the diameter direction of the optical fiber shown in FIG. 40. The relative index difference $\Delta^+$ ($=(nc-n_{OC})/n_{OC}$) between the core 310x and the outer cladding 310$_{OC}$ is 1.2%, and the relative index difference $\Delta^-$ ($=n_{IC-nOC}/n_{OC}$) between the inner cladding 310$_{IC}$ and the outer cladding 310$_{OC}$ is −0.6%. wherein nc is the refractive index of the core 310x, n$_{IC}$ is the refractive index of the inner cladding 310$_{IC}$, n$_{OC}$ is the refractive index of the outer cladding 310$_{OC}$. The nonlinear refractive index n$_2$ is $3.8 \times 10^{-16}$ (cm²/W), and the mode field diameter MFD is 5.2 μm.

Figure 42:
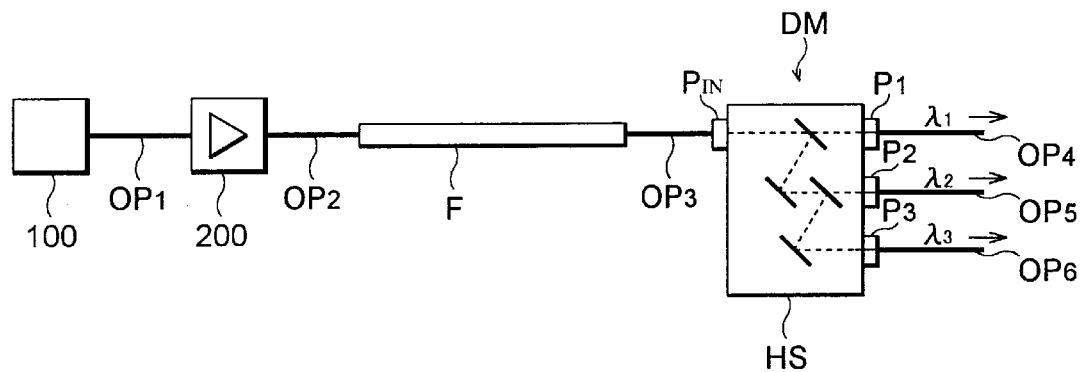
FIG. 42 a view showing the structure of a system using the SC light source apparatus.

FIG. 42 shows a light source system using the above light source apparatus. Light source 100 is an optical fiber ring laser, and generation pulse light in the 1.55 μm band. Light source 100 and optical fiber amplifier 200 are connected by an optical fiber OP1. Optical fiber amplifier 200 is an Erbium doped fiber amplifier. The pulse light in the 1.55 μm band emitted from optical fiber amplifier 200 is input into the one of the optical fibers F for SC light generation stated above through optical fiber OP2. Optical fiber F emits SC light. The SC light emitted from optical fiber F is directed into the optical demultiplexer DM through optical fiber OP3. The SC light includes components of wavelengths $\lambda 1$, $\lambda 2$ and $\lambda 3$. The optical demultiplexer DM comprises a housing HS; a input port P$_{IN}$ a first output port P1, a second output port P2, and a third output port P3 attached to the housing HS; and a plurality of optical filters F1, F2, F3, F4 and F5 arranged in the housing HS. Optical fibers F1, F2, F3, F4 and F5 are dichroic mirrors. Note that this optical demultiplexer DM comprises a plurality of lenses which are not shown therein.

The optical filter F1 transmits the light of wavelength $\lambda 1$, and reflects lights of wavelengths $\lambda 2$ and $\lambda 3$. The optical filter F2 reflects at least wavelengths $\lambda 2$ and $\lambda 3$ light. The optical filter F3 transmits the light of wavelength $\lambda 2$, and reflects light of wavelength $\lambda 3$. The optical filter F4 reflects at least light of wavelength $\lambda 3$. The light of wavelength $\lambda 1$ passing through optical filter F1 is directed to the output port P1, and exits through optical fiber OP4. Wavelength $\lambda 2$ light passing through the optical filter F3 is directed to the output port P2, and exits through an optical fiber OP5. Wavelength λ3 light reflected by optical filter F4 is directed to the output port P3, and exits through an optical fiber OP6.

An optical fiber F that has a chromatic dispersion D that decreases in the light propagating direction can be used not only for the SC light generation and but also for an idler light generation.

Figure 43:
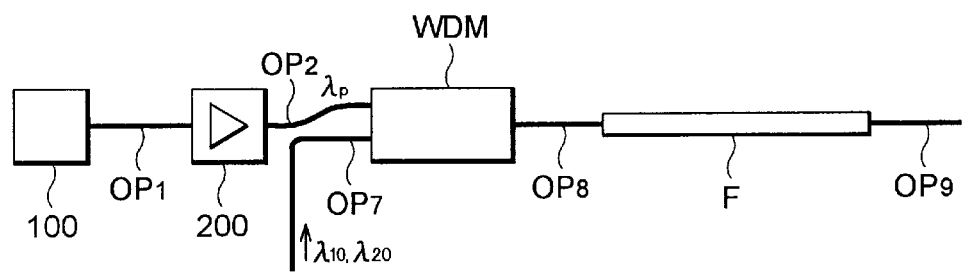
FIG. 43 a view showing the structure of a system using the idler light source apparatus.

FIG. 43 shows a light source apparatus for generating the idler light. This apparatus comprises a light source 100 for emitting excitation light (pump light) in the 1.55 μm band; an Erbium doped optical fiber amplifier 200 connected through an optical fiber OP1 that amplifies the excitation light; an optical multiplexer WDM into which the excitation light and a plurality of signal lights λ10 and λ20 are respectively introduced through optical fibers OP2 and OP7; optical fibers OP8 and F into which the light multiplexed by the optical multiplexer WDM is sequentially introduced; and an optical fiber OP9 into which the light emitted from the optical fiber F is introduced.

Note that the peak power of the excitation light λp is weaker than the degree that the excitation light λp itself becomes SC light by passing through the optical fiber F. The plurality of signal lights λ10 and λ20 are introduced into the optical multiplexer WDM through the optical fiber OP7.

Figure 44:
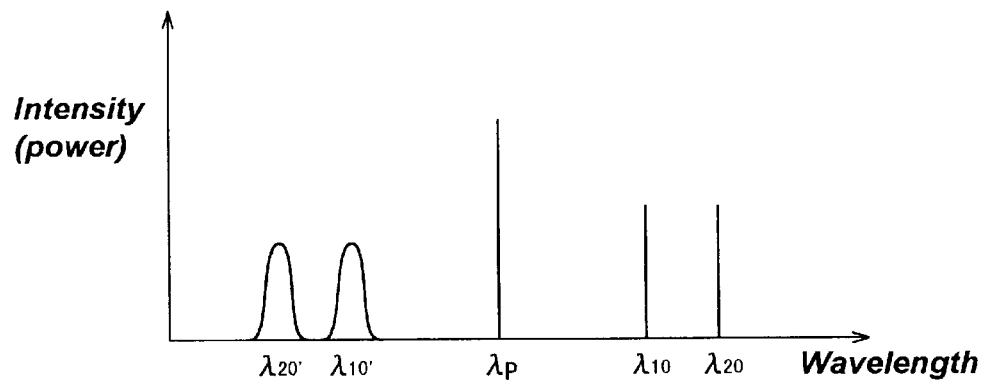
FIG. 44 is a graph showing the relation between the wavelength λ (nm) and the optical intensity.

FIG. 44 shows the relation between the excitation light λp, signal lights λ10, λ20 and emitted light $\lambda_{10}'$, $\lambda_{20}'$ and the light intensities thereof. When the signal light $\lambda_{10}$ is introduced into optical fiber F, light having wavelength symmetrically positioned to the excitation light λp, i.e., idler light $\lambda_{10}'$ (=λp−($\lambda_{10}$−λp)) is generated in optical fiber F and emitted from the optical fiber F. When the signal light λ20 is introduced into optical fiber F, light having wavelength symmetrically positioned to the excitation light λp, i.e., idler light $\lambda_{20}'$ (=λp−($\lambda_{20}$−λp)) is generated in the optical fiber F and emitted from the optical fiber F. In other words, the idler lights having the wavelengths $\lambda_{10}'$, $\lambda_{20}'$ and the signal lights having the wavelengths $\lambda_{10}$, $\lambda_{20}$ are in phase conjunction relation. The idler light generation is believed to be a result of the four-wave mixing. Note that the chromatic dispersion D of optical fiber F decreases in the length direction, thereby the zero-dispersion wavelength λ0 increases in the length direction when the dispersion slope is positive. The wavelength λp of excitation light emitted from the excitation light source 100 can be changed. Therefore, the wavelengths $\lambda_{10}'$, $\lambda_{20}'$ of the idler lights can be changed by varying the wavelength λp of the excitation light without changing the wavelengths $\lambda_{10}'$, $\lambda_{20}'$ of the signal lights, and avoiding the sudden power decreasing of the idler light.

FIG. 45 to FIG. 51 are graphs showing the relation between the wavelength λp (nm) of the excitation light and the intensity (power) of the idler light $\lambda_{10}'$ (or λ20'). The respective incident light intensities of the excitation light and the signal light are both 10 dBm.

Figure 45:
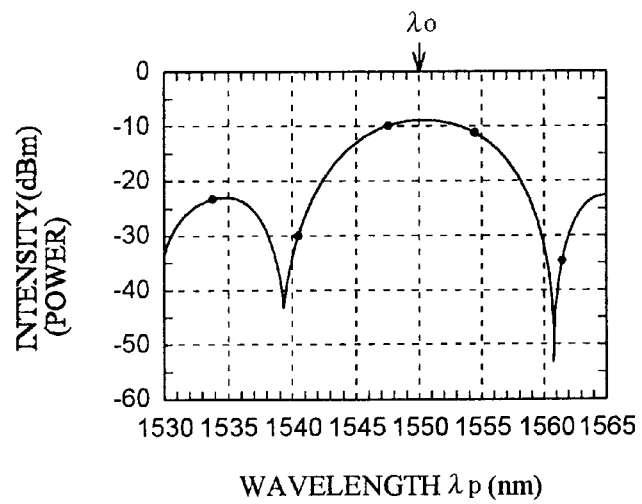
FIG. 45 is a graph showing the relation between the wavelength λ (nm) and the optical intensity (dBm)

FIG. 45 shows the relation between the wavelength λp (nm) of the excitation light and the intensity (power) (dBm) of the idler light $\lambda_{10}'$, when the wavelength λp of the excitation light is varied while maintaining the wavelength difference Δλ between the wavelength λp (nm) of the excitation light and the wavelength $\lambda_{10}$ (nm) of the signal light constant value 5 nm. The zero-dispersion wavelength λ0 of the evaluated 1 km optical fiber F is constant in the length direction and 1550 nm. In this case, the high intensity of the idler light λ20' is obtained when the wavelength λp of the excitation light corresponds to the zero-dispersion wavelength λ0, and the output power of the idler light suddenly decreases when λp is near the wavelength of 1539 nm or 1561 nm. The valley of the efficiency is observed.

Figure 46:
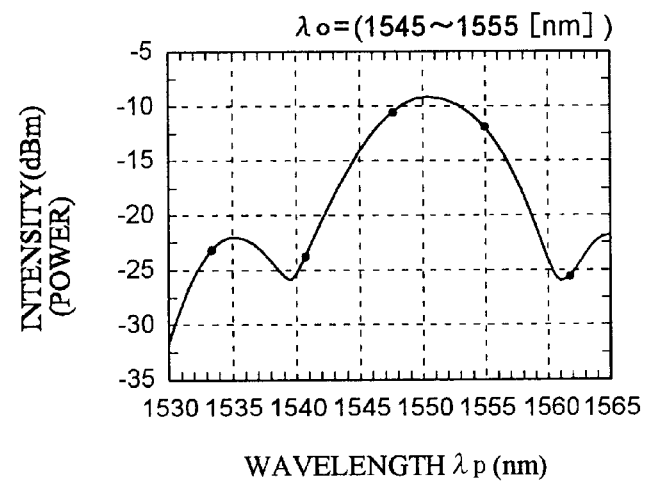
FIG. 46 is a graph showing the relation between the wavelength λ (nm) and the optical intensity (dBm)

FIG. 46 shows the relation between the wavelength λp (nm) of the excitation light and the intensity (power) (dBm) of the idler light λ10', when the wavelength λp of the excitation light is varied while maintaining the wavelength difference Δλ between the wavelength λp (nm) of the excitation light and the wavelength λ10 (nm) of the signal light at a constant value 5 nm. The zero-dispersion wavelength λ0 of the evaluated 1 km optical fiber F varies linearly from 1545 nm to 1555 nm in the length direction. In this case, the maximum intensity of the idler light $\lambda_{10}'$ is obtained when the wavelength λp of the excitation light corresponds to the zero-dispersion wavelength λ0 as similar to the above. However, the variation in the output power of the idler light to the wavelength λp is decreased.

Figure 47:
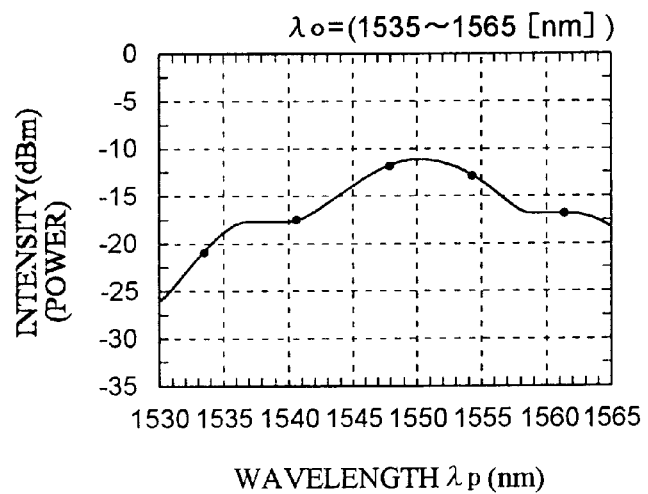
FIG. 47 is a graph showing the relation between the wavelength λ (nm) and the optical intensity (dBm)

FIG. 47 shows the relation between the wavelength λp (nm) of the excitation light and the intensity (power) (dBm) of the idler light $\lambda_{10}'$, when the wavelength difference Δλ between the wavelength λp (nm) of the excitation light and the wavelength $\lambda_{10}$ (nm) of the signal light is maintained at a constant value 5 nm and allowing the wavelength λp of the excitation light to be varied. The zero-dispersion wavelength λ0 of the evaluated 1 km optical fiber F varies linearly from 1535 nm to 1565 nm in the length direction. In this case, the maximum intensity of the idler light $\lambda_{10}'$ is obtained when the wavelength λp of the excitation light corresponds to the zero-dispersion wavelength λ0 as similar to the above. However, the variation in the output power of the idler light to the wavelength λp is further decreased than the above, and the fiber is believed to be a fiber having low λp dependency, i.e., a fiber usable in a wide band optical communication.

Figure 48:
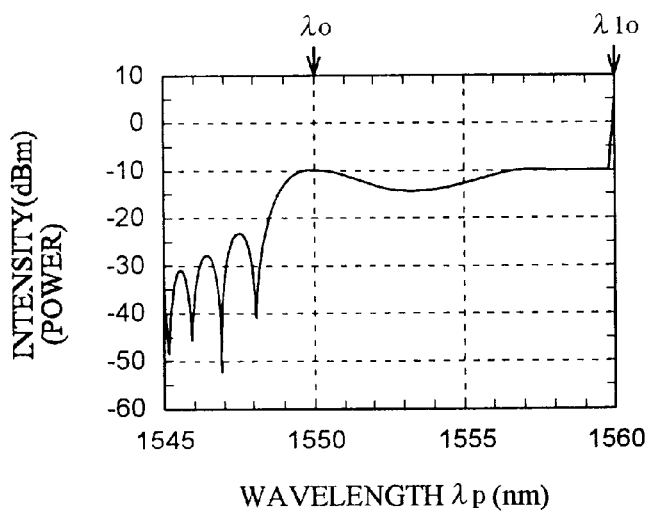
FIG. 48 is a graph showing the relation between the wavelength λ (nm) and the optical intensity (dBm)

FIG. 48 shows the relation between the wavelength λp (nm) of the excitation light and the intensity (power) (dBm) of the idler light $\lambda_{10}'$, when that the wavelength λp of the excitation light is varied while the wavelength $\lambda_{10}$ of the signal light is fixed at 1560 nm. The zero-dispersion wavelength λ0 of the evaluated 1 km optical fiber F is 1550 μm and is constant in the length direction. In this case, the maximum intensity of the idler light $\lambda_{10}'$ is obtained when the wavelength λp of the excitation light is equal to or near the zero-dispersion wavelength λ0. However, when λp is shorter than λ0, the intensity of the idler light suddenly decreases.

Figure 49:
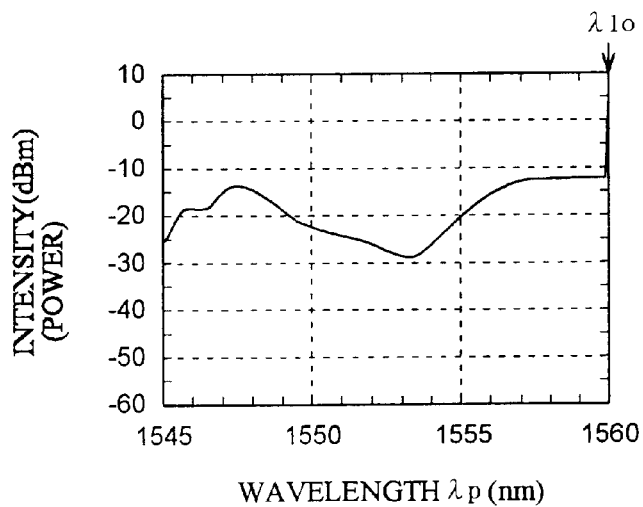
FIG. 49 is a graph showing the relation between the wavelength λ (nm) and the optical intensity (dBm)

FIG. 49 shows the relation between the wavelength λp (nm) of the excitation light and the intensity (power) (dBm) of the idler light $\lambda_{10}'$, when the wavelength $\lambda_{10}$ of the signal light is fixed at 1560 nm and the wavelength λp of the excitation light is varied. The zero-dispersion wavelength λ0 of the evaluated 1 km optical fiber F varies linearly from 1542 nm to 1552 nm in the length direction linearly. In this case, the maximum intensity of the idler light $\lambda_{10}'$ is obtained when the λp of the excitation light is within the zero-dispersion wavelength λ0 range and within 5 nm from the signal light wavelength $\lambda_{10}$. However, even when λp is shorter than λ0, the intensity of the idler light is not so much decreased as compared to the above. Note that an idler light $\lambda_{10}'$ was found to have high intensity when the zero-dispersion wavelength λ0 varies linearly 5 nm or more in the length direction.

Figure 50:
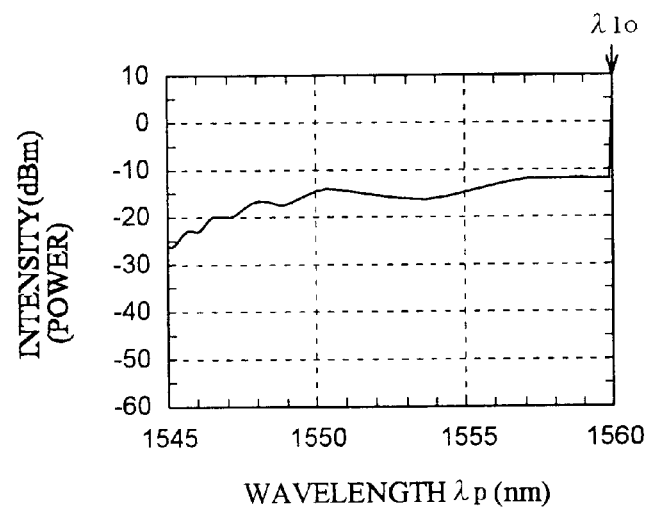
FIG. 50 is a graph showing the relation between the wavelength λ (nm) and the optical intensity (dBm)

FIG. 50 shows the relation between the wavelength λp (nm) of the excitation light and the intensity (power) (dBm) of the idler light $\lambda_{10}'$, when the wavelength $\lambda_{10}$ of the signal light is fixed at 1560 nm and the wavelength λp of the excitation light is varied. The zero-dispersion wavelength λ0 of the evaluated 1 km optical fiber F varies linearly from 1545 nm to 1555 nm in the length direction. In this case, the intensity of the idler light $\lambda_{10}'$ is almost uniform within a wavelength range of 1545 nm to 1560 nm. This result indicates that the intensity of the idler light is not changed even when $\lambda p$ is varied, thereby flexibility of the wavelength of the idler light is obtained, i.e., the band can be widened.

Figure 51:
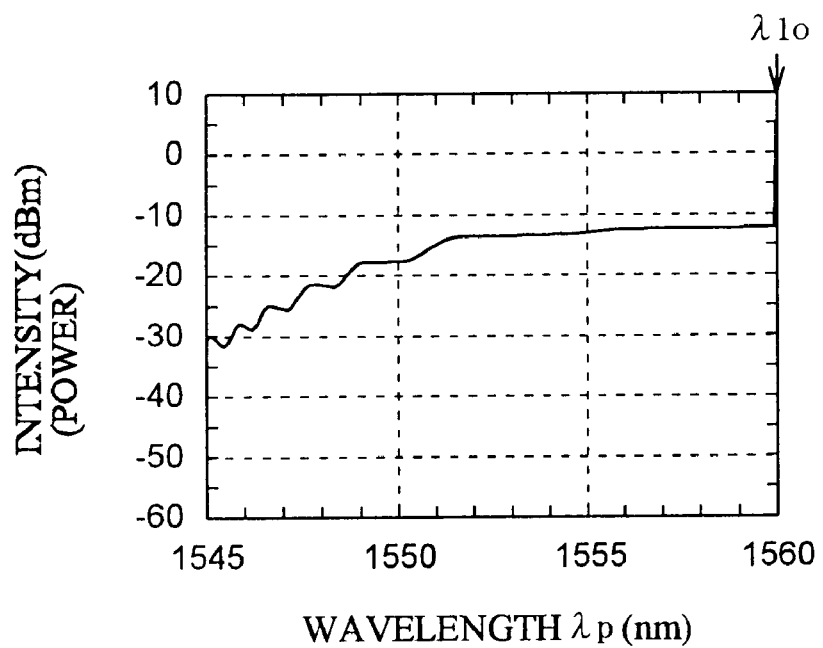
FIG. 51 is a graph showing the relation between the wavelength λ (nm) and the optical intensity (dBm).

FIG. 51 shows the relation between the wavelength $\lambda p$ (nm) of the excitation light and the intensity (power) (dBm) of the idler light $\lambda_{10}'$, when the wavelength $\lambda_{10}$ of the signal light is fixed at 1560 nm and the wavelength $\lambda p$ of the excitation light is varied. The zero-dispersion wavelength $\lambda_0$ of the evaluated 1 km optical fiber F is varied linearly from 1547 nm to 1557 nm in the length direction. The intensity of the idler light $\lambda 10'$ is almost uniform within a wavelength range of 1550 nm to 1560 nm, and the band can be widened as similar to the case of FIG. 50.

It is preferable that the wavelength $\lambda p$ of the excitation light correspond to the zero-dispersion wavelength $\lambda 0$ in order to gonorating idler light efficiently. The zero-dispersion wavelength $\lambda 0$ of the present optical fiber F differs in the longitudinal direction thereof and the distributed range of the zero-dispersion wavelength $\lambda 0$ includes the wavelength $\lambda p$. That is, the wavelength $\lambda p$ of the excitation light corresponds to a predetermined zero-dispersion wavelength $\lambda 0$ at a predetermined position in the longitudinal direction of the optical fiber F.

Therefore, the present optical fiber F can efficiently generated idler lights $\lambda_{10}'$, $\lambda_{20}'$ regardless of the wavelength $\lambda p$ of the excitation light. It is preferable that the absolute value of the chromatic dispersion slope $D_{SLOP}$ is 0.04 (ps/nm$^2$/km) or less in order to generated idler light efficiently. Further, it is preferable that the fiber has a region having the dispersion D within the wavelength range of the signal light $\lambda_{10}$ (or $\lambda_{20}$) decreases or increases in the length direction of the fiber F.

It is preferable that, when the nonlinear refractive index of the optical fiber is $n_2$, the effective sectional area of the core is Aeff and the peak power of the incident pulse light in the optical fiber is Ppeak, $n_2 \geq 3.2 \times 10^{-20}$ (m$^2$/W), Aeff$\leq 50 \times 10^{-12}$ (m$^2$) and Ppeak>10$\times 10^{-3}$ (W) in order to cause the generation of nonlinear optical effect. Therefore, satisfying the expression $(n_2/\text{Aeff}) \times \text{Ppeak} > 6.4 \times 10^{-12}$ is preferable. Further, satisfying the expression $n_2 \geq 4 \times 10^{-20}$ (m$^2$/W) is further preferable in order to cause the generation of nonlinear optical effect.

Further, it is preferable that the relative index difference $\Delta^+$ (=(nc-$n_{OC}$)/$n_{OC}$) between the core $310x$ and the outer cladding $310_{OC}$ is 1.2% or more, and the relative index difference $\Delta^-$ (=($n_{IC}$-$n_{OC}$)/$n_{OC}$) between the inner cladding $310_{IC}$ and the outer cladding $310_{OC}$ is $-0.6\%$ or less shown in FIG. 40, in order to cause the generation of nonlinear optical effect. Note that the refractive index $n_{OC}$ of the present outer cladding $310_{OC}$ is equal to the refractive index of quartz.

The present invention is not limited to the particular embodiments and examples described above. Various changes and modifications may be made within the spirit and scope of the invention. For example, the chromatic dispersions may be decreased exponentially. The detailed characteristics of an optical fiber for SC light generation are not limited to the numerical values in the above examples.

As has been described above, an optical fiber according to the present invention has a main supercontinuum light generation region which is a dispersion decreasing region in which the chromatic dispersion does not increase but partially decreases in the direction in which light travels. When high peak pulse light is input to the dispersion decreasing region of an optical fiber of the present invention, self-phase modulation at least during the initial period, and then four wave mixing are efficiently obtained, thereby efficiently generating nonlinear phenomenal light such as SC light or idler light.

From the invention thus described, it will be obvious that the invention may be varied in many ways. Such variations are not to be regarded as a departure from the spirit and scope of the invention, and all such modifications as would be obvious to one skilled in the art and intended for inclusion within the scope of the following claims.

The basic Japanese Application No. 8-195078 (195078/1996) filed on Jul. 24, 1996 is hereby incorporated by reference.

What is claimed is:

1. An optical fiber for emitting a nonlinear light in response to the input of a pulse light having a predetermined wavelength, comprising a main region for generating the nonlinear light, said main region having a dispersion decreasing region having a chromatic dispersion, the chromatic dispersion decreasing from a positive-value in the pulse light propagation direction;

wherein the chromatic dispersion decreases from the positive-value to a negative-value in the pulse light propagation direction in said dispersion decreasing region; and wherein the absolute value of a chromatic dispersion slope in a predetermined wavelength range in said dispersion decreasing region is 0.1 ps/nm$^2$/km or less.

2. An optical fiber according to claim 1, wherein said nonlinear light is a supercontinuum light.

3. An optical fiber according to claim 1, wherein said dispersion decreasing region has a zero-dispersion wavelength in a 1.5 $\mu$m wavelength band at a predetermined point of said fiber.

4. An optical fiber according to claim 1, wherein a portion of said optical fiber has an average diameter per 1 km decreasing or increasing 2 $\mu$m or more in the longitudinal direction thereof.

5. An optical fiber according to claim 1, having a core, wherein a portion of said optical fiber has a ratio of the diameter of the core to the diameter of the fiber decreasing or increasing 0.005 or more in the longitudinal direction thereof.

6. An optical fiber according to claim 1, wherein said dispersion decreasing region comprises a portion having a core and a cladding surrounding said core, and wherein the diameters of said core and said cladding both decrease or increase in the longitudinal direction thereof.

7. An optical fiber according to claim 6, wherein the relative index difference between said core and quartz is 1.2% or more, and the relative index difference between said cladding near said core and quartz is $-0.6\%$ or less.

8. An optical fiber according to claim 1, wherein the absolute value of the chromatic dispersion slope in a predetermined wavelength range in said dispersion decreasing region is 0.04 ps/nm$^2$/km or less.

9. An optical fiber for emitting a nonlinear light in response to the input of a pulse light having a predetermined wavelength, comprising a main region for generating the nonlinear light, said main region having a dispersion decreasing region having a chromatic dispersion, the chromatic dispersion decreasing from a positive-value in the pulse light propagation direction, wherein said dispersion decreasing region has polarization-maintaining characteristics.

10. An optical fiber for emitting a nonlinear light in response to the input of a pulse light having a predetermined wavelength, comprising a main region for generating the nonlinear light, said main region having a dispersion decreasing region having a chromatic dispersion, the chromatic dispersion decreasing from a positive-value in the pulse light propagation direction, wherein, in the dispersion decreasing region, in $n_2$, Aeff, and Ppeak respectively represent a nonlinear refractive index, an effective sectional area of a core, and peak power of the pulse light, the following relation is satisfied: $(n_2/\text{Aeff}) \times \text{Ppeak} > 4.5 \times 10^{10}$.

11. An optical fiber for emitting a nonlinear light in response to the input of a pulse light having a predetermined wavelength, comprising a main region for generating the nonlinear light, said main region having a dispersion decreasing region having a chromatic dispersion, the chromatic dispersion decreasing from a positive-value in the pulse light propagation direction, wherein, in the dispersion decreasing region, in $n_2$, Aeff, and Ppeak respectively represent a nonlinear refractive index, an effective sectional area of a core, and peak power of the pulse light, the following relation is satisfied: $(n_2/\text{Aeff}) \times \text{Ppeak} > 6.4 \times 10^{-12}$.

12. An optical fiber for emitting a nonlinear light in response to the input of a pulse light having a predetermined wavelength, comprising a main region for generating the nonlinear light, said main region having a dispersion decreasing region having a chromatic dispersion, the chromatic dispersion decreasing from a positive-value in the pulse light propagation direction;

wherein, in the dispersion decreasing region, in $n_2$, Aeff, and Ppeak respectively represent a nonlinear refractive index, an effective sectional area of a core, and peak power of the pulse light, the following relation is satisfied: $(n_2/\text{Aeff}) \times \text{Ppeak} > 6.4 \times 10^{-12}$; and wherein the nonlinear refractive index $n_2$ is $4 \times 10^{-20}$ ($m^2/W$) or more.

13. A light source apparatus comprising:

an optical fiber for outputting a nonlinear light in response to a pulse light input thereto, comprising a dispersion decreasing region having a chromatic dispersion in a predetermined wavelength region, the chromatic dispersion decreasing from a positive-value in the pulse light propagation direction;

wherein the chromatic dispersion decreases from the positive-value to a negative-value in said dispersion decreasing region;

wherein the absolute value of a chromatic dispersion slope in a predetermined wavelength range in said dispersion decreasing region is 0.1 $ps/nm^2/km$ or less; and a light source optically coupled to one end of said optical fiber for emitting the pulse light.

14. A light source apparatus comprising:

an optical fiber for outputting a nonlinear light in response to a pulse light input thereto, comprising a dispersion decreasing region having a chromatic dispersion in a predetermined wavelength region, the chromatic dispersion decreasing from a positive-value in the pulse light propagation direction;

wherein the chromatic dispersion decreases from the positive-value to a negative-value in said dispersion decreasing region;

wherein the absolute value of a chromatic dispersion slope in a predetermined wavelength range in said dispersion decreasing region is 0.1 $ps/nm^2/km$ or less;

a light source optically coupled to one end of said optical fiber for emitting the pulse light; and an optical demultiplexer optically coupled to the other end of said optical fiber.

15. A light source apparatus comprising:

an optical fiber for outputting a nonlinear light in response to a pulse light input thereto, comprising a dispersion decreasing region having a chromatic dispersion in a predetermined wavelength region, the chromatic dispersion decreasing from a positive-value in the pulse light propagation direction;

wherein the chromatic dispersion decreases from the positive-value to a negative-value in said dispersion decreasing region;

wherein the absolute value of a chromatic dispersion slope in a predetermined wavelength range in said dispersion decreasing region is 0.1 $ps/nm^2/km$ or less;

a light source optically coupled to one end of said optical fiber for emitting the pulse light; and an optical demultiplexer optically coupled to the other end of said optical fiber for mixing the pulse light and a plurality of signal light.

16. A light source apparatus comprising:

a light source for emitting excitation light; and an optical fiber for emitting a nonlinear light in response to the input of the excitation light from said light source and signal light, having a chromatic dispersion slope, having a zero-dispersion wavelength varied in the longitudinal direction, the zero-dispersion wavelength being within a predetermined wavelength range including the wavelength of the excitation light, the absolute value of the chromatic dispersion slope in a wavelength range of the signal light being 0.4 $ps/nm^2/km$ or less;

wherein the chromatic dispersion decreases from a positive-value to a negative-value in a dispersion decreasing region.

17. A light source apparatus according to claim 16, wherein the nonlinear light is an idler light.

18. A light source apparatus according to claim 16, wherein the wavelength of the excitation light is changeable.

19. An optical fiber for emitting a nonlinear light in response to a signal light and a pump light input thereto, the wavelength of the pump light being different from that of the signal light, wherein said optical fiber has a chromatic dispersion slope in a wavelength range of the signal light, the absolute value of the chromatic dispersion slope being 0.04 $ps/nm^2/km$ or less, and wherein said optical fiber has a zero-dispersion wavelength varying 5 nm or more in the longitudinal direction thereof;

wherein the chromatic dispersion decreases from a positive-value to a negative-value in a dispersion decreasing region.

* * * * *